(12) United States Patent
Uludag

(10) Patent No.: US 10,818,079 B2
(45) Date of Patent: Oct. 27, 2020

(54) SYSTEMS AND METHODS FOR RENDERING REFLECTIONS

(71) Applicant: Electronic Arts Inc., Redwood City, CA (US)

(72) Inventor: Yasin Uludag, Stockholm (SE)

(73) Assignee: Electronic Arts Inc., Redwood City, CA (US)

( * ) Notice: Subject to any disclaimer, the term of this patent is extended or adjusted under 35 U.S.C. 154(b) by 46 days.

(21) Appl. No.: 16/101,103

(22) Filed: Aug. 10, 2018

(65) Prior Publication Data

US 2020/0051324 A1 Feb. 13, 2020

(51) Int. Cl.
*G06T 15/50* (2011.01)
*G06T 11/40* (2006.01)
*G06T 15/06* (2011.01)

(52) U.S. Cl.
CPC ............ *G06T 15/506* (2013.01); *G06T 11/40* (2013.01); *G06T 15/06* (2013.01)

(58) Field of Classification Search
None
See application file for complete search history.

(56) References Cited

PUBLICATIONS

Jin, Bongjun, et al. "Selective and adaptive supersampling for real-time ray tracing." Proceedings of the Conference on High Performance Graphics 2009. ACM, 2009.*

Author Unknown, "Real Image Formation by Plane Mirror", published in 2017, retrieved from https://physics.stackexchange.com/questions/361895/real-image-formation-by-plane-mirror on May 26, 2020.*

Uludag, Yasin. "Hi-Z Screen-Space Cone-Traced Reflections," GPU Pro 5: Advanced Rendering Techniques, Ch. 4, pp. 149-192, published by A.K. Peters/CRC Press (May 20, 2014).

Andersson et al. "Shiny Pixels and Beyond: Real-Time Raytracing at SEED." SEED, Game Developers Conference 2018 (GDC 2018) (Mar. 19-23, 2018).

Stachowiak, Tomasz. "Stochastic all the things: Raytracing in hybrid real-time rendering." SEED, Digital Dragons 2018 (May 21-22, 2018).

Stachowiak et al. "Stochastic Screen-Space Reflections." Advances in Real-Time Rendering course, SIGGRAPH 2015 (Aug. 9-13, 2015).

* cited by examiner

*Primary Examiner* — Zhengxi Liu
(74) *Attorney, Agent, or Firm* — Leydig, Voit & Mayer, Ltd.

(57) ABSTRACT

Embodiments of the disclosure provide systems and method for rendering reflections. To add reflections to a pixel in an image, ray marching is used to attempt to find a ray intersection for primary reflections. When using rasterization to render a scene, objects outside the viewport are culled. As such, ray marching may fail in various situations, such as when a ray marched ray exits the viewport without intersecting any other object of the scene. In such a situation where ray marching fails, the ray can be re-cast as a ray traced ray. The ray traced ray is cast into the full 3D (three-dimensional) scene with all objects present (i.e., objects are not culled). Ray tracing is then used to attempt to find a ray intersection, i.e., for a primary reflection. The disclosed embodiments can be used in real-time or near-real time applications, such as video games.

20 Claims, 27 Drawing Sheets

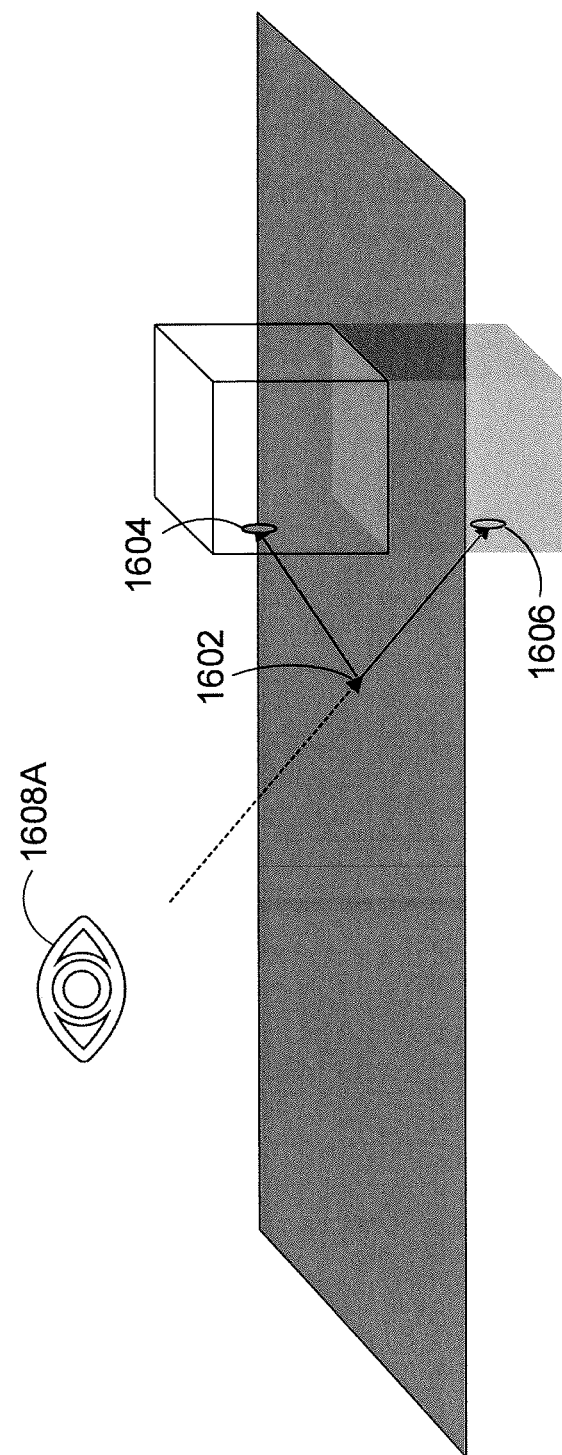

SYSTEMS AND METHODS FOR RENDERING REFLECTIONS

FIELD

This disclosure generally relates to computer graphics and, more particularly, to systems and methods for rendering reflections.

BACKGROUND

Computer-generated images are often created by examining a geometric model of a view space and modeled objects in the view space. The geometric model of the objects can have arbitrary resolution, but typically each object is represented by a finite number of polygons, such as triangles, positioned in the view space and having a color, color pattern, or texture over their surface and/or an alpha value or values representing transparency of the polygon. An image is typically output (i.e., stored, displayed, transmitted, or otherwise processed) as a pixel array.

One common feature of computer-generated images is to include reflections in the image that is output. Including reflections provides for more visually realistic results. In certain applications, such as animated films, ray tracing techniques can be used to provide ray traced reflections, which gives good results. However, ray tracing is computationally expensive. For complex scenes, it may take hours or days to renders a single frame of a video sequence using ray traced reflections, even when using very powerful computers or render farms.

In other applications, such as video games, computational speed is a priority. In video games, frames are rendered very quickly, i.e., in real-time or near real-time, as a user interacts with a video game. As such, ray tracing techniques for reflections (which can take hours or days to render a single frames) are not suitable for video games. For this reason, various other techniques have been developed to render reflections in video games in real-time or near-real time. However, these other techniques suffer from poor quality, particularly when compared to the reflections obtained from full ray tracing.

As such, there remains a need in the art for a system and method for rendering reflections that overcomes the drawbacks and limitations of existing approaches.

SUMMARY

One embodiment provides a method, computer-readable storage medium, and device for generating reflection information for a pixel in an image. The method includes: determining, by one or more processors, a roughness value of a surface of an object in the pixel; determining, by the one or more processors, a number of rays to spawn for the pixel based on the roughness value; for each ray in the number of rays, selecting, by the one or more processors, a ray direction for the ray; for each ray in the number of rays, performing, by the one or more processors, ray marching of the ray based on the ray direction of the ray; for each ray where ray marching is successful, storing, by the one or more processors, color information of an object intersected by the ray discovered via ray marching; for each ray where ray marching fails, casting, by the one or more processors, the ray via ray tracing and storing color information of an object intersected by the ray discovered via ray tracing; and generating, by the one or more processors, reflection information for the pixel based on the color information of objects intersected by rays discovered via ray marching and the color information of objects intersected by rays discovered via ray tracing.

One embodiment provides a method, computer-readable storage medium, and device for generating reflection information in an image. The method includes: determining, by one or more processors, a first roughness value of a surface of an object in a first pixel of the image; determining, by the one or more processors, a number of rays to spawn for the first pixel based on the first roughness value; identifying, the one or more processors, a second pixel within a threshold radius of the first pixel in the image; determining, by a one or more processors, a second roughness value of a surface of an object in the second pixel; determining, by the one or more processors, that a difference between the first roughness value and the second roughness value is below a roughness threshold; determining, by the one or more processors, color information of an object intersected by a reflection ray corresponding to the second pixel; and generating, by the one or more processors, reflection information for the first pixel based on the color information of the object intersected by the reflection ray corresponding to the second pixel, wherein the first pixel is included in a first set of pixels and the second pixel is included in a second set of pixels, wherein color information of objects intersected by reflection rays corresponding to the pixels in the second set of pixels is determined via ray tracing and/or ray marching, and wherein color information of objects intersected by reflection rays corresponding to the pixels in the first set of pixels is determined based on the color information of the objects intersected by the reflection rays corresponding to the pixels in the second set of pixels.

One embodiment provides a method, computer-readable storage medium, and device for generating reflection information. The method includes: determining, for a first frame, a location of intersection of an object based on a reflection ray for a first pixel, wherein the location of intersection of the object corresponds to a shape of an ellipse; determining, for the first frame, a location in a reflection realm of the intersection of the object based on the reflection ray for the first pixel; projecting, for the first frame, a first line from the location in the reflection realm of the intersection of the object by the reflection ray for the first pixel towards a first location of a camera; determining, for the first frame, a location of intersection of the first line on a surface of a first object; determining, for a second frame, a location of intersection of an object based on a reflection ray for a second pixel, wherein the second frame is subsequent to the first frame; determining, for the second frame, a location in the reflection realm of the intersection of the object based on the reflection ray for the second pixel; projecting, for the second frame, a second line from the location in the reflection realm of the intersection of the object by the reflection ray for the second pixel towards a second location of the camera; determining, for the second frame, a location of intersection of the second line on a surface of a second object; and determining that a surface roughness of the location of intersection of the second line on the surface of the second object is within a threshold roughness of a surface roughness of the location of intersection of the first line on the surface of the first object; and generating reflection information for the second pixel based on reflection information for the first pixel.

BRIEF DESCRIPTION OF THE DRAWINGS

FIG. 16A is an example of a reflection, according to one embodiment.

DETAILED DESCRIPTION

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of the disclosure provide systems and method for rendering reflections. The disclosed embodiments can be performed in real-time or near real-time, and are thus suitable for applications such as video games. As discussed in greater detail herein, the disclosed embodiments use rasterization to render primary eye rays (i.e., from a virtual camera onto screen space) of a 3D (three-dimensional) virtual scene. To add reflections, for each pixel in screen space, ray marching is used to attempt to find a ray intersection for primary reflections. When using rasterization to render a scene, objects outside the viewport are culled. As such, ray marching may fail in various situations, such as when a ray marched ray exits the viewport without intersecting any other object of the scene. In such a situation where ray marching fails, the ray can be re-cast as a ray traced ray. The ray traced ray is cast into the full 3D scene with all objects present (i.e., objects are not culled). Ray tracing is then used to attempt to find a ray intersection, i.e., for a primary reflection. The disclosed embodiments can be used in real-time or near-real time applications, such as video games, to achieve visually pleasing reflections that may be, in some cases, indistinguishable from fully ray traced reflections.

Figure 1:
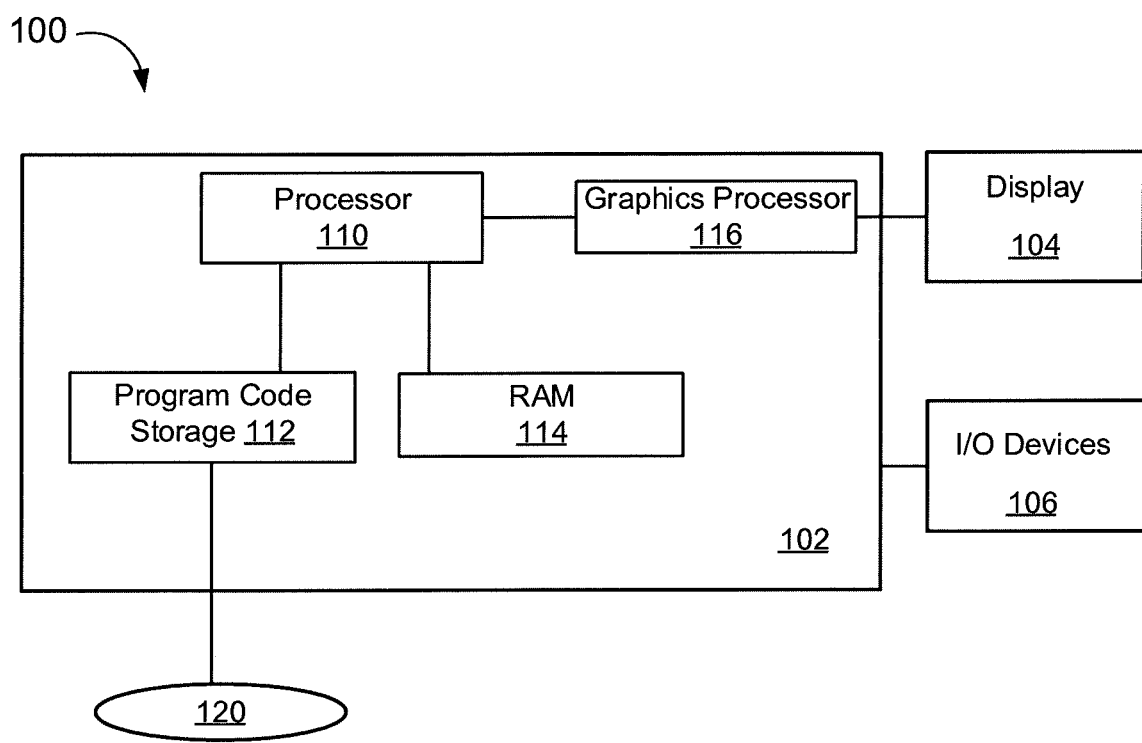
FIG. 1 is a block diagram of a computer system for rendering images, according to aspects of the present disclosure.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
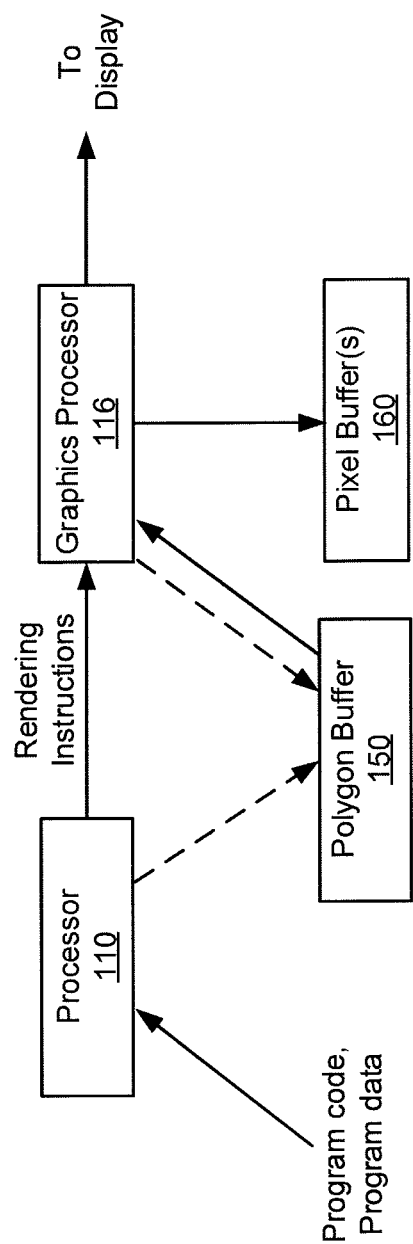
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
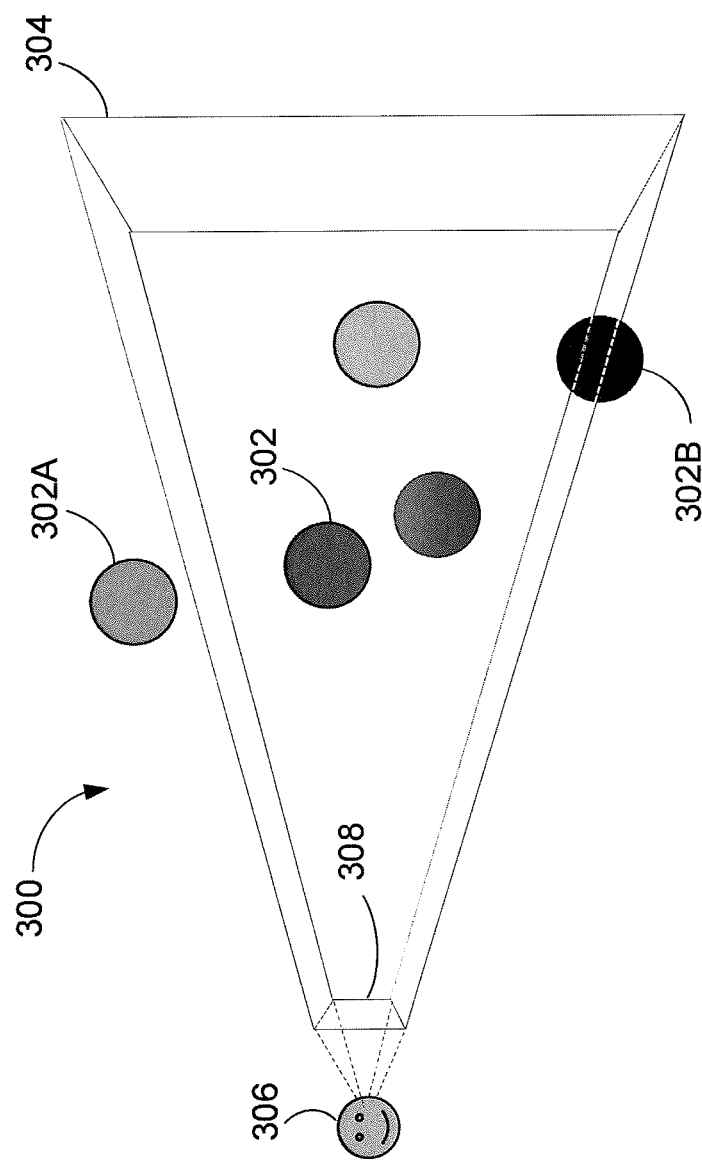
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects 302, 302A-302B. Each object 302 can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (i.e., the image represented by screen space 308) can change as the camera 306 moves in 3D space relative to the objects 302 in the scene. Also, the objects 302 can move in the scene 300.

Figures 4A, 4B:
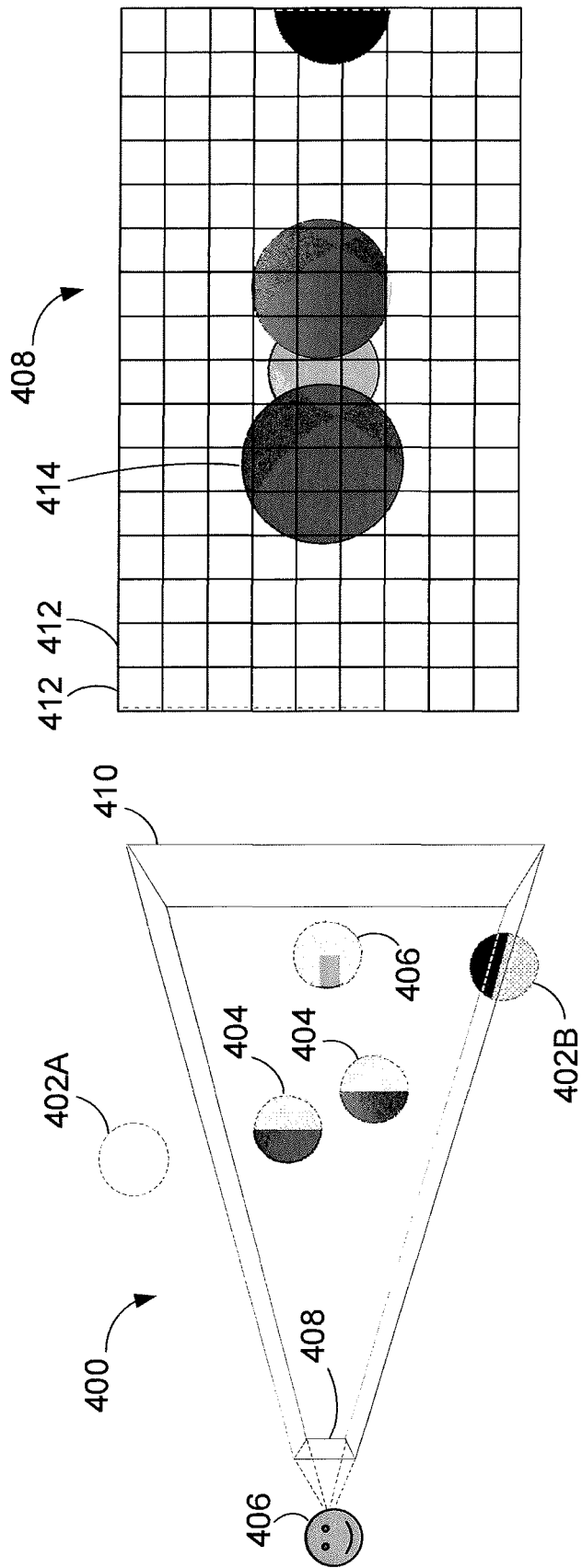
FIG. 4A is a block diagram illustrating rending a scene using rasterization, according to one embodiment.
FIG. 4B is an example of a rasterized image of a scene, according to one embodiment.

FIG. 4A is a block diagram illustrating rendering a scene 400 using rasterization, according to one embodiment. Similar to the image shown in FIG. 3, scene 400 includes a plurality of objects. A camera 406 is configured to capture an image of the scene 400, represented in screen space 408. The camera 406 observes the scene 400 through viewport 410.

The disclosed embodiments involve rasterizing the objects in the scene 400 to generate the image in screen space 408. Rasterization strives to render the pixels as those that are directly visible from the camera 406. Rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion 404 of objects that cannot be seen by the camera 406. In some embodiments, depth testing can be performed to remove, on a per pixel basis in screen space 408, portions 406 of objects that are occluded by other objects.

When rasterization is complete, an image of scene in screen space 408 is generated. In some embodiments, pixel density of the screen space 408 can also result in information loss about the objects in the scene 400.

FIG. 4B is an example of a rasterized image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, and/or surface texture information (e.g., roughness value), etc. The result of rasterization is, therefore, a 2D image with relatively limited information of the actual 3D scene. Adding reflections to rasterized images can be a difficult problem to solve since the information needed for high-quality reflections may be outside of the viewport 410 and/or behind objects that have been partially culled, thus the information about those objects is no longer available to the renderer.

As discussed, when reflections are added to the image shown in FIG. 4B, limited information is available to the renderer. Since various objects and portions of objects have been culled to generate the rasterized image, data for those objects and portions of objects that have been culled may no longer be available, and cannot be used to add reflections. For example, data corresponding to object 402A (i.e., that was culled by frustum culling) is no longer available to add reflection to objects that are not culled, such as object 414.

Figure 5:
FIG. 5 is an example image illustrating different types of reflections, according one embodiment.

FIG. 5 is an example image illustrating different types of reflections, according one embodiment. In some embodiments, reflections can be categorized a specular reflections or glossy reflections. A bottom right portion 502 of the image represents specular reflections, and a top left portion 504 of the image represents glossy reflections.

A reflection can be specular or glossy based on the roughness (or smoothness) of the surface that forms the reflection. As used herein, specular reflections refer to mirror-like reflections from a smooth surface; whereas, glossy reflections result from parallel rays of light reflecting from a surface that comprises a plurality of microfacets, where the reflected rays reflect or bounce off the microfacets in various different directions towards an observer or camera.

Figure 6:
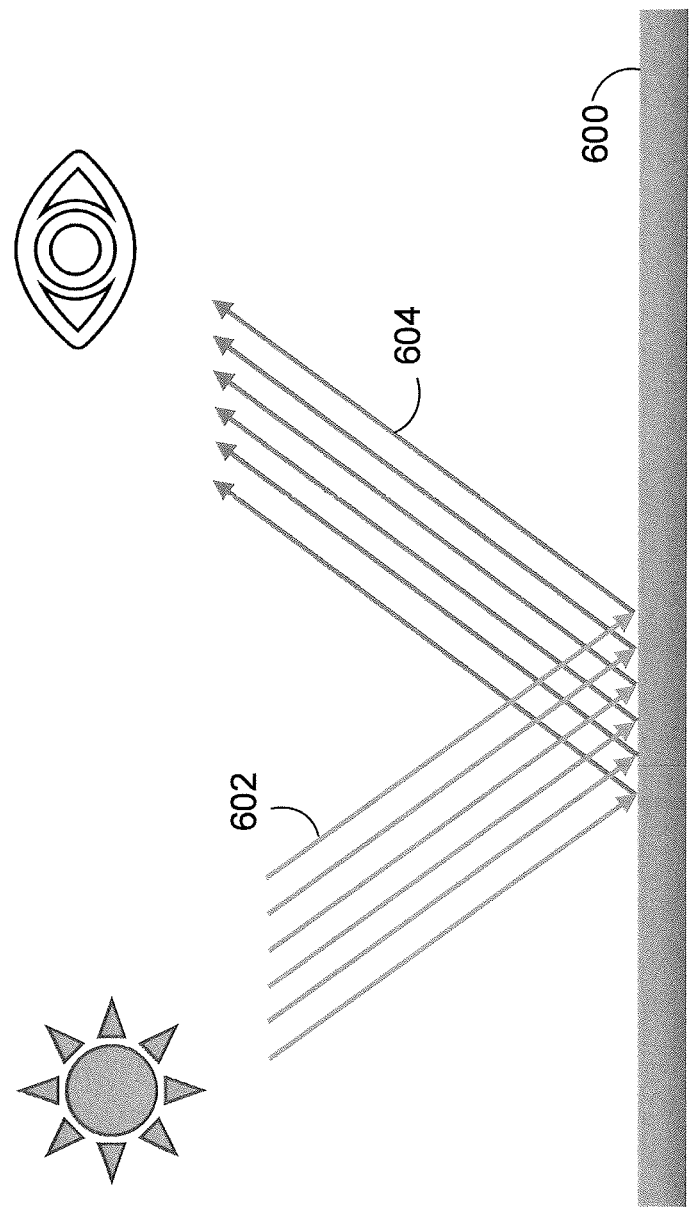
FIG. 6 is block diagram illustrating specular reflections, according to one embodiment.

FIG. 6 is block diagram illustrating specular reflections, according to one embodiment. Surface 600 is flat and has a smooth face. Incident parallel light rays 602 reflect from the surface 600 as reflected rays 604. Since the surface 600 has a smooth face, the reflected rays 604 are also parallel, like the incident light rays 602. The result is a mirror-like reflection from the surface.

Figure 7:
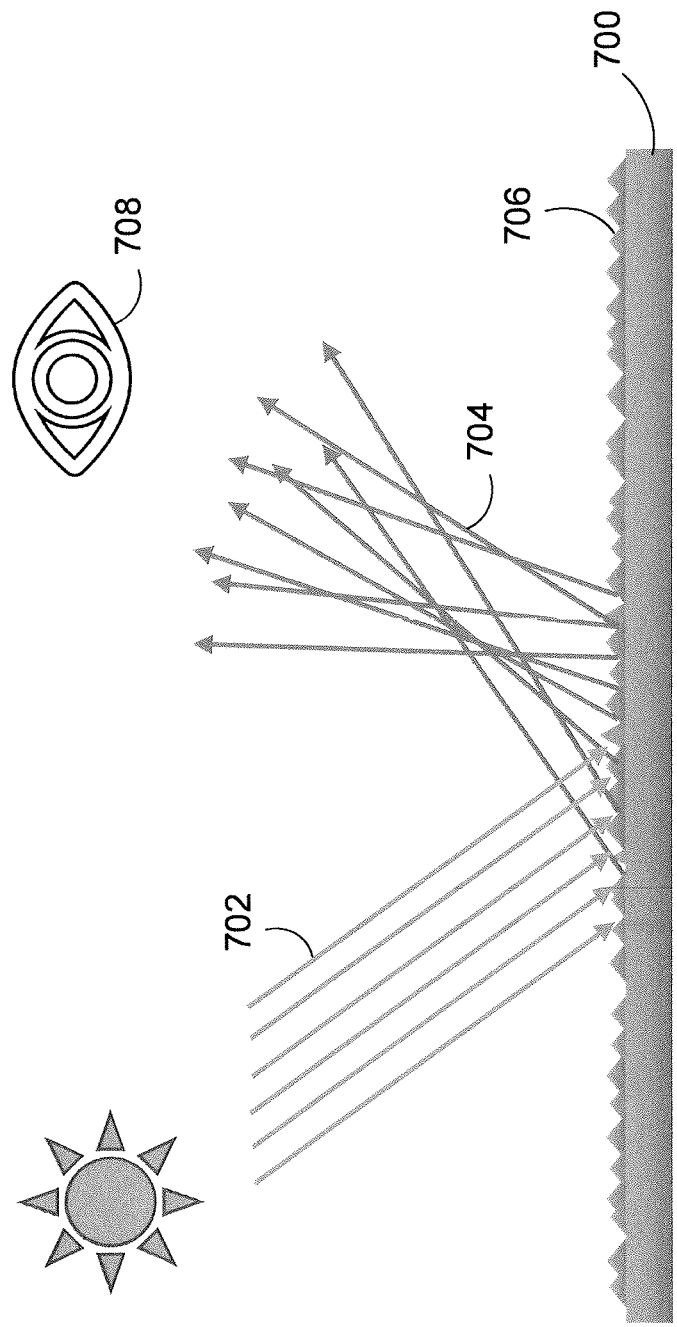
FIG. 7 is block diagram illustrating glossy reflections, according to one embodiment.

FIG. 7 is block diagram illustrating glossy reflections, according to one embodiment. Surface 700 is not smooth and includes a plurality of microfacets 706 (e.g., reflective surfaces with random orientations). Incident parallel light rays 702 reflect from the surface 700 as reflected rays 704. Since the surface 700 is not smooth, the reflected rays 704 reflect from the microfacets 706 in a plurality of directions towards an observer or camera 708. Glossy reflections, therefore, have a blurred effect when viewed by an observer or camera 708.

As disclosed herein, reflections can be formed on objects from nearby objects. In one embodiment, a technique for determining the reflection of one object onto another is referred to as ray marching. As described below, ray marching can result in a ray marching success or ray marching failure.

Figure 8B:
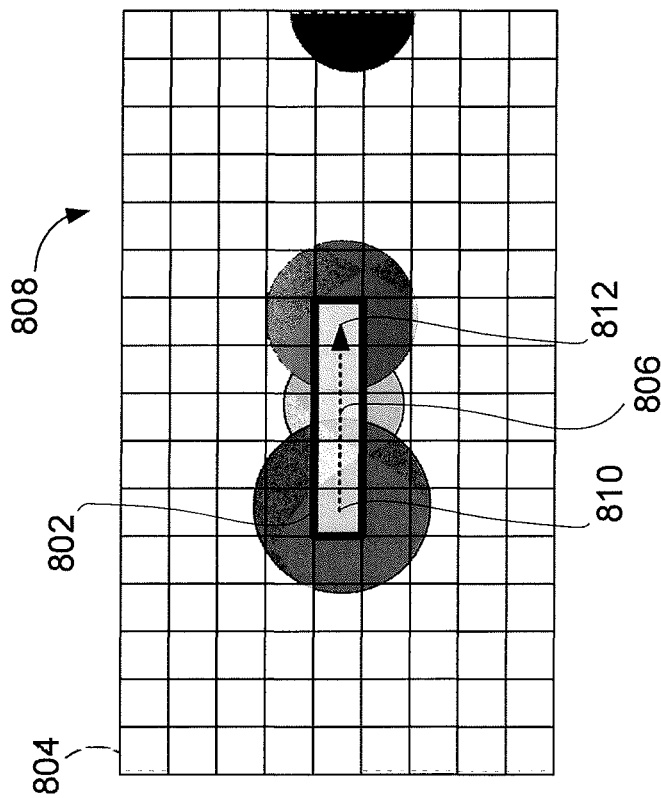
FIG. 8B illustrates an image in screen space, according to one embodiment.
Figure 8A:
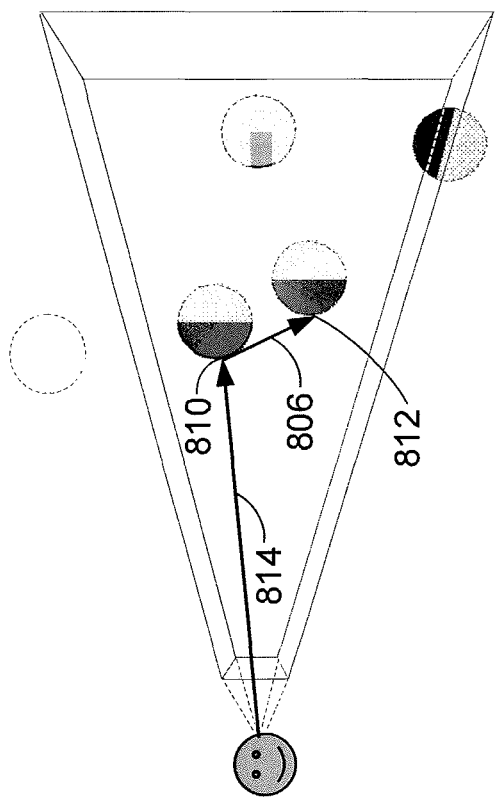
FIG. 8A is a block diagram illustrating ray marching success, according to one embodiment.

FIG. 8A is a block diagram illustrating ray marching success, according to one embodiment. An image in screen space 808 of the scene is shown in FIG. 8B. For each pixel in the image in screen space 808, a processor determines whether an object is shown in the pixel. The object that is visible for a given pixel is represented in FIG. 8A as eye ray 814. Some pixels, such as pixel 804, may show background (e.g., sky), and thus no object. In some embodiments, ray marching is omitted for any background pixels, such as pixel 804.

In one embodiment, for each pixel in the image in screen space 808 where an object is displayed, such as pixel 802, ray marching is performed. As discussed above, for the object shown in pixel 802, the processor has access to data corresponding to the position of the object within the pixel 802, the color of the object, the object's orientation, and/or surface texture information (e.g., roughness value), etc. Based on this data about the object, one or more rays can be marched to determine a color of reflections to be shown at the pixel 802.

In some implementations, for smooth surfaces, one ray is marched from the pixel 802. As discussed, smooth surfaces result is specular reflections, where the reflected light forms parallel rays. Therefore, just one ray is needed to determine the reflection information for smooth surfaces. However, for rougher surfaces where the reflected light forms rays that travel in various directions, multiple rays are used to determine the reflection information. In some implementations, the number of rays that are marched for a pixel increases for rougher surfaces. In some implementations, the number of rays that are marched can be capped at a ray limit per frame, such as four rays, for example. In the example shown in FIGS. 8A-8B, one ray is shown for clarity, although multiple rays can be marched from pixel 802 in various directions (i.e., for glossy reflections).

As shown in FIGS. 8A-8B, point 810 on an object in the scene corresponds to pixel 802. Based on the surface orientation on the object at point 810, a direction of a primary reflection ray 806 can be determined. The ray 806 is cast in that direction based on the surface orientation on the object at point 810. In one implementation, the ray 806 "marches" pixel by pixel through the image in screen space 808 to determine whether the ray 806 intersects another object in the image in screen space 808. An intersection can be determined by examining a depth value (so-called "z-value") of the objects in a given pixel compared to a depth (z-value) of the ray 806 at the given pixel. As shown, ray 806 intersects another object at point 812, which is four pixels away in the example image shown. The ray march of ray 806 results in a "ray marching success," since another object in screen space 808 is intersected by the ray 806. The color information from point 812 can be stored in a buffer to compute the color of the reflection displayed at pixel 802. As described, multiple rays can be cast from point 810 in various directions based on the surface roughness at point 810. Color information of the object that is intersected by the ray marched rays is stored for each ray that results in a ray marching success, and can be aggregated to form the final reflection information at pixel 802.

Figure 9B:
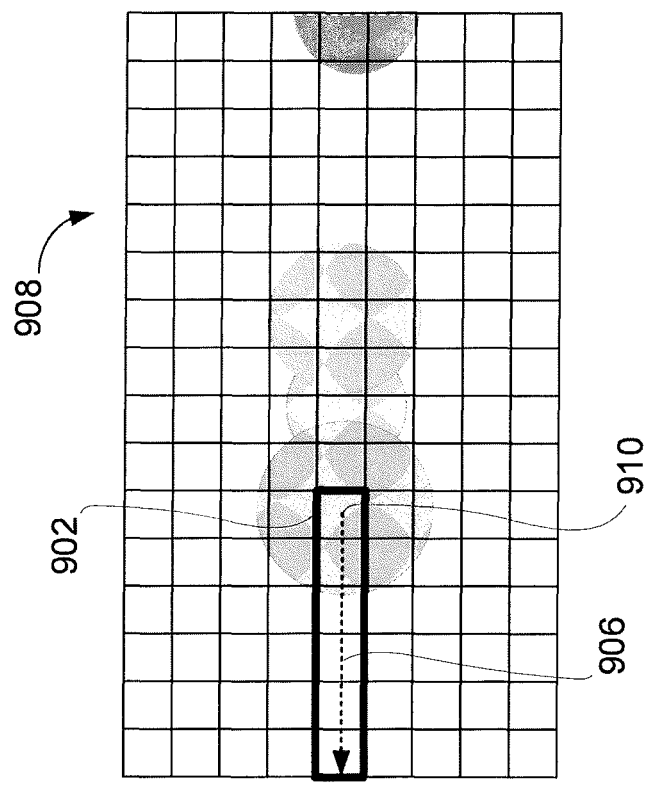
FIG. 9B illustrates an image in screen space of the scene is shown in FIG. 9A, according to one embodiment.
Figure 9A:
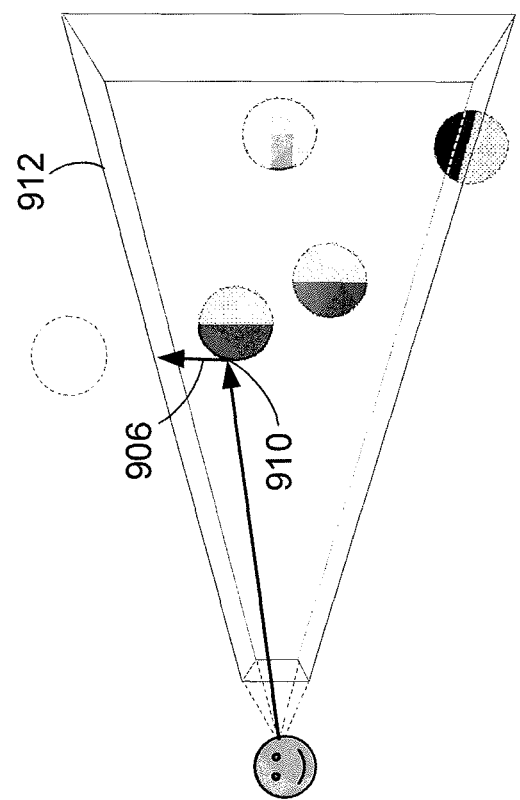
FIG. 9A is a block diagram illustrating ray marching failure, according to one embodiment.

However, some rays that are marched may not intersect any objects in the image in screen space 808 before reaching the edge of the viewport, referred to as "ray marching failure." FIG. 9A is a block diagram illustrating ray marching failure, according to one embodiment. An image in screen space 908 of the scene is shown in FIG. 9B.

As shown, at pixel 902, point 910 on an object is displayed. Based on the surface orientation (and/or surface roughness) at point 910, one or more rays are marched from point 910. One ray 906 is shown for clarity. The direction of ray 906 is based on the surface orientation at point 910. The ray 906 marches pixel by pixel through screen space 908. However, the ray 906 reaches the edge of the viewport 912 without intersecting any other objects. This is considered a ray marching failure. When a ray marching failure occurs, no color information for the reflection can be obtained for point 910 based on the ray marched ray 906. The number and/or percentage of ray marching failures that occurs in an image can depend on the complexity of the scene, the arrangement of objects in the scene, and the surface orientations of the objects in the pixels of the screen space image.

One embodiment for performing ray marching involves traversing the screen space image pixel-by-pixel until either another object is intersected (i.e., ray marching success, FIG. 8B) or the edge of the viewport is reached (i.e., ray marching failure, FIG. 9B). Another embodiment for performing optimized ray marching is described in FIGS. 10A-10D and FIG. 11.

In some embodiments, for the image in screen space, a z-buffer can be generated. The z-buffer stores, for each pixel in the image in screen space, a depth value (relative to the camera position) of the nearest object in the scene. If there are no objects shown in screen space for a given pixel, the z-buffer may store a null value for that pixel.

In addition, N number of additional coarser representations of the z-buffer may be computed. The number N is configurable. For example, N may be 5. In each coarser level representation of the z-buffer, pixels can be collapsed or downscaled (relative to the next finer level) in groups of powers of 2 (i.e., 2 pixels, 4 pixels, 8 pixels, 16 pixels, etc.). In one implementation, downscaling a set of z-values to one z-value is performed by setting the downscaled z-value to the minimum z-value of the set of z-values that is downscaled.

One embodiment for performing optimized ray marching is described herein. As described, the processor examines the full size (original) z-buffer to determine whether a ray cast from an origin pixel intersects another object in a neighboring pixel in the direction of the ray. If not, the processor examines the corresponding pixel location in the next coarser z-buffer level. At the next coarser z-buffer level, the next "pixel" in the ray direction is examined to check for an intersection. Again, since the coarser z-buffer represents a plurality of pixels, marching one "pixel" in the coarser z-buffer corresponding to marching or "jumping" across multiple pixels of the original image. If no intersection is found in the next pixel in the coarser z-buffer, then the next coarser z-buffer is selected and examined. If the coarsest z-buffer (e.g., the Nth z-buffer) is already selected, then traditional ray marching pixel by pixel (in the coarsest z-buffer) to look for an intersection.

If an intersection is found in one of the coarser z-buffers, then the processor "goes up a level" and examines the pixel location of the intersection in the next finer z-buffer and ray marches in the ray direction in the next finer z-buffer. In this manner, when an intersection is found, the processor upscales once to the next finer z-buffer, and continues to perform ray marching. Each time the processor steps in the ray direction (at the appropriate level of the z-buffer) without hitting anything, the processor downscales to the next coarser z-buffer to potentially skip over larger regions on the screen. As soon as there is an intersection, the processor upscales to the next finer z-buffer to refine the data and then go back to and ray-march. If the processor ends up intersecting something at the finest level, the process is done as an intersection point has been found.

Figure 10A:
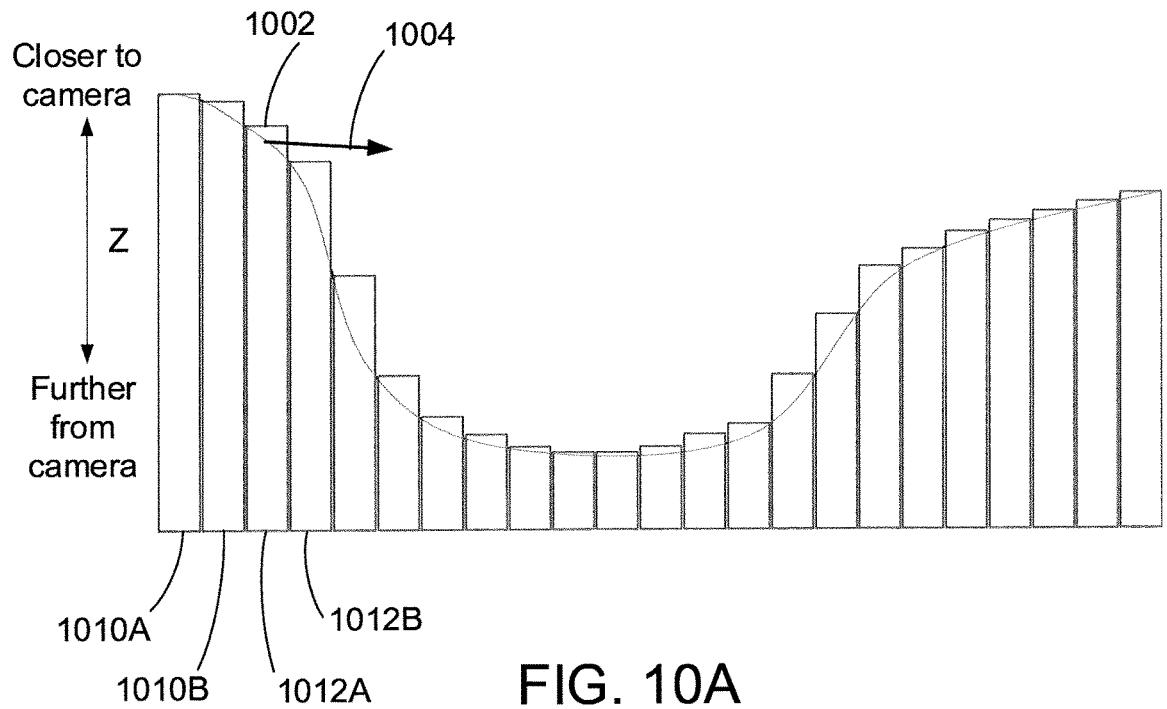
FIG. 10A is a graphical representation of a portion of z-buffer data, according to one embodiment.

FIG. 10A is a graphical representation of a portion of a z-buffer, according to one embodiment. Depth values (i.e., z-values) are shown in the vertical axis, with pixels that have objects closer to the camera shown with larger histogram bars, and pixels that have objects further from the camera shown with smaller histogram bars in FIG. 10A. For pixel location 1002, a ray 1004 can be marched in a particular direction based on the surface orientation at pixel location 1002. The histogram bars shown in FIG. 10A represent the z-values of the pixels in the direction of ray 1004 in screen space.

Figure 10B:
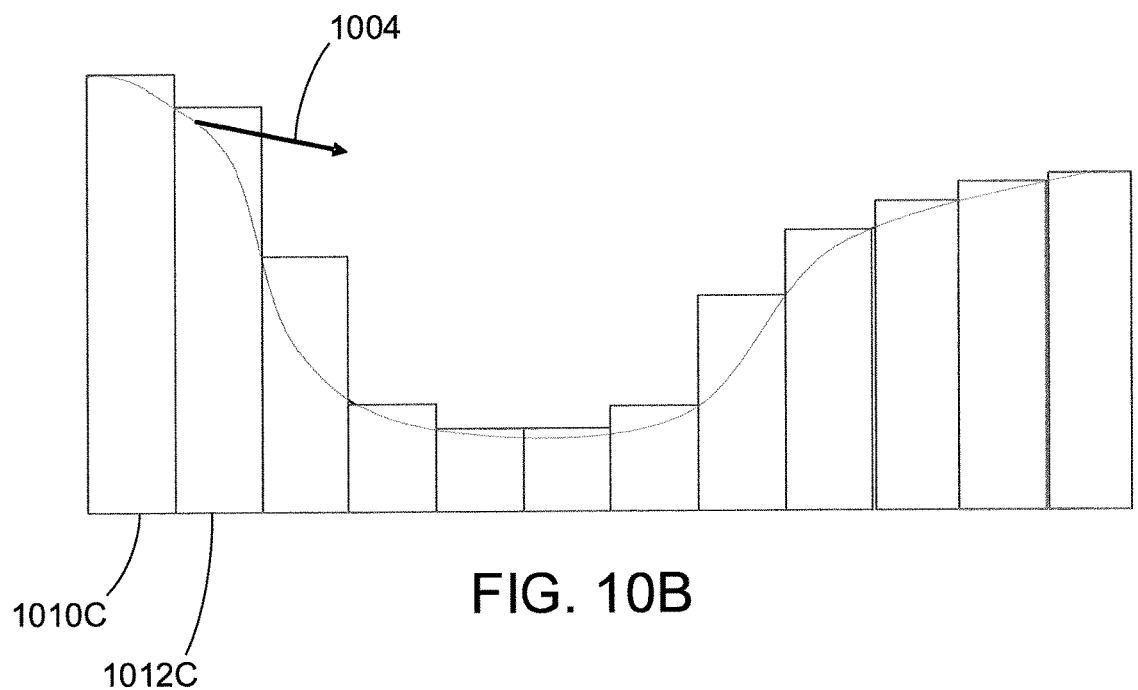
FIGS. 10B-10D illustrate graphical representations of collapsing the z-buffer data, according to one embodiment.

To perform optimized ray marching, a z-buffer of the depth values of objects in screen space is accessed by a processor. A graphical representation of downscaled the z-buffer is shown in FIG. 10B. Referring to FIGS. 10A-10B, the z-values 1010A and 1010B in FIG. 10A have been downscaled to z-value 1010C in FIG. 10B. Similarly, the z-values 1012A and 1012B in FIG. 10A have been downscaled to z-value 1012C in FIG. 10B. Since no intersection was found in the next pixel in FIG. 10A, the processor examines the next coarser z-buffer, such as that shown in FIG. 10B. In FIG. 10B, the processor again determines whether ray 1004 intersects the z-buffer in the neighboring pixel. If not, the processor examines the next coarser z-buffer, as shown in FIG. 10C.

Figure 10C:
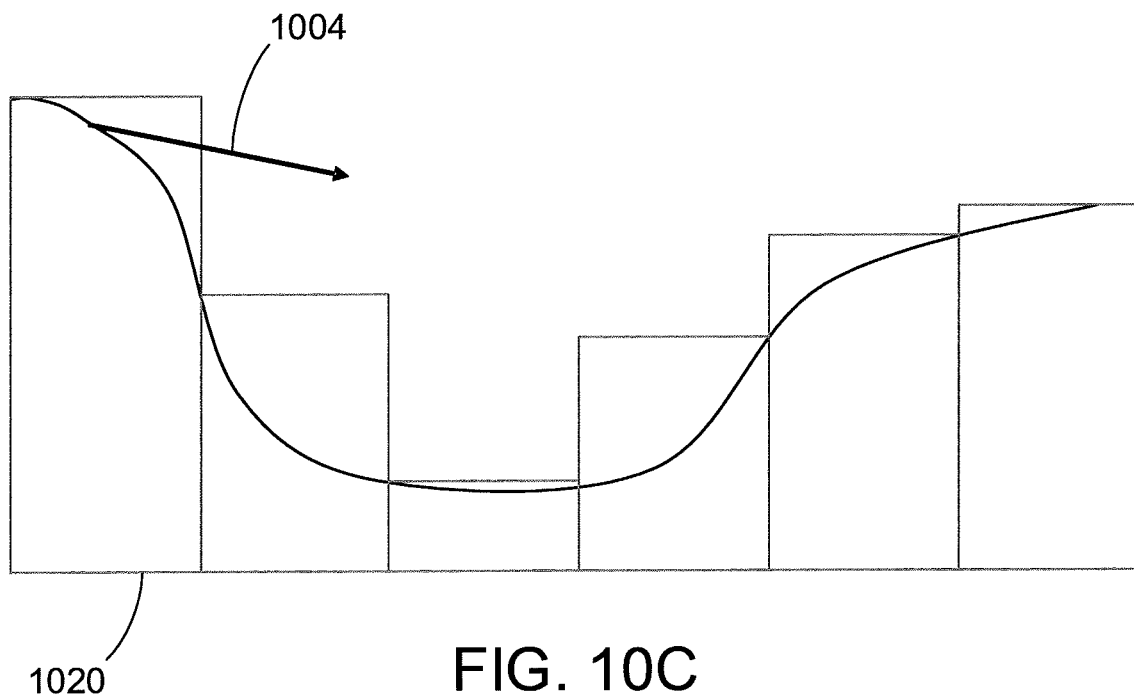

A graphical representation of a further downscaled z-buffer is shown in FIG. 10C. Referring to FIGS. 10B-10C, the z-values 1010C and 1012C in FIG. 10B have been downscaled to z-value 1020 in FIG. 10C. Again, the ray 1004 is tested to determine whether the ray 1004 intersects the z-buffer in the neighboring pixel in the further downscaled z-buffer. In one embodiment, this process is repeated until the ray intersects a neighboring downscaled z-value or the edge of the viewport is reached. In one embodiment, once the coarsest z-buffer is reached, the ray can be cast "pixel by pixel" in the most downscaled z-buffer space to determine whether an intersection is found.

Figure 10D:
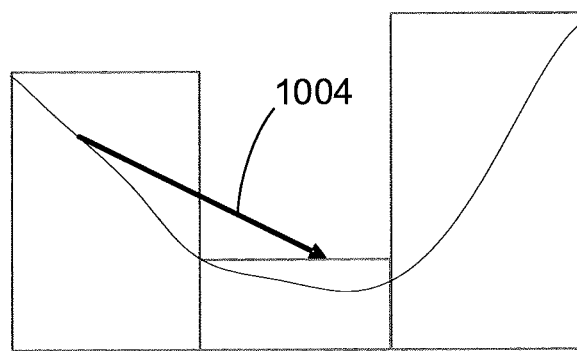

A graphical representation of a still further collapsed z-buffer is shown in FIG. 10D. As shown in FIG. 10D, the ray intersects another z-buffer value in the downscaled z-buffer. This indicates a ray marching success.

At this stage, the processor selects the next finer z-buffer ("goes down a level") and identifies the pixel in the next finer z-buffer. Ray marching is then done on the next finer level to look for an intersection. In this manner, ray marching can move through empty spaces efficiently by taking larger steps using the coarser z-buffer data.

Figure 11:
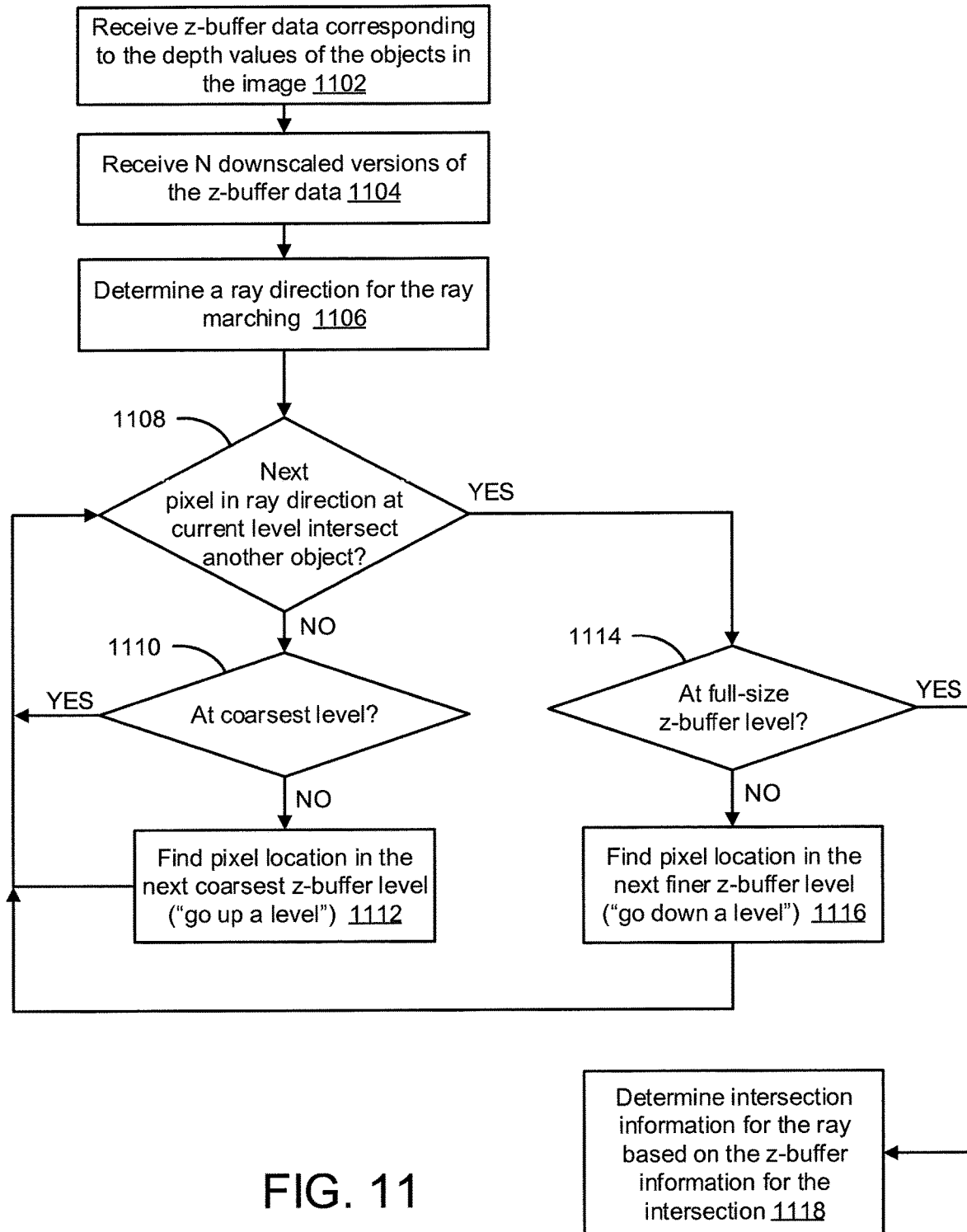
FIG. 11 is a flow diagram of method steps for performing ray marching, according to one embodiment.

FIG. 11 is a flow diagram of method steps for performing ray marching, according to one embodiment. In some implementations, a 2D image of a scene can be generated using screen space rasterization. For each pixel in the 2D image, a z-value correspond to the depth of the object shown in the pixel can be stored in a z-buffer.

At step 1102, a processor receives z-buffer data corresponding to the depth values of the objects in the image. The z-buffer data may comprise the full z-buffer, or a portion of the z-buffer. At step 1104, the processor receives N downscaled version of the z-buffer data. Each downscaled version of the z-buffer data may combine depth information from two or more pixels. In some implementations, the downscaled version of the z-buffer data takes the minimum depth value for a set of z-values to be downscaled.

For a given pixel from which ray marching is performed, at step 1106, the processor determines a ray direction for the ray marching. At step 1108, the processor determines whether the next pixel location in the z-buffer data (at the current level, which is initially the full-size buffer level) in the direction of the ray intersects another object based on the z-value at the next pixel location. If no intersection is found, the processor, at step 1110, determines whether the current level is the coarsest z-buffer level. If yes, the method returns to step 1108, where the processor ray marches to the next pixel at the current level. If at step 1110, the processor determines that the current level is not the coarsest z-buffer level, then at step 1112, the processor finds a pixel location in the next coarsest z-buffer corresponding to the pixel (i.e., "go up a level"). The method then returns to step 1108, where the processor ray marches to the next pixel at the current level (which has just been downscaled to the next coarser level).

If at step 1108 the processor find an intersection in the next pixel location, then at step 1114 the processor determines whether the current level is the original (full-size) z-buffer level. If yes, then at step 1118, the processor determines intersection information for the ray based on the z-buffer information for the intersection (i.e., ray marching success).

If at step 1114 the processor determines that the current level is not the original (full-size) z-buffer level, then at step 1116 the processor finds a pixel location in the next finer z-buffer corresponding to the pixel (i.e., "go down a level"). The method then returns to step 1108, where the processor ray marches to the next pixel at the current level (which has just been upscaled to the next finer level).

As such, the method of FIG. 11 provides an optimized ray marching technique, where large empty spaces can be traversed more quickly than examining the screen space pixel by pixel.

However, as described above in FIGS. 9A-9B, in some cases, ray marching may result in a ray marching fail. One embodiment of the present disclosure provides for ray tracing rays that have a ray marching failure.

Figure 12:
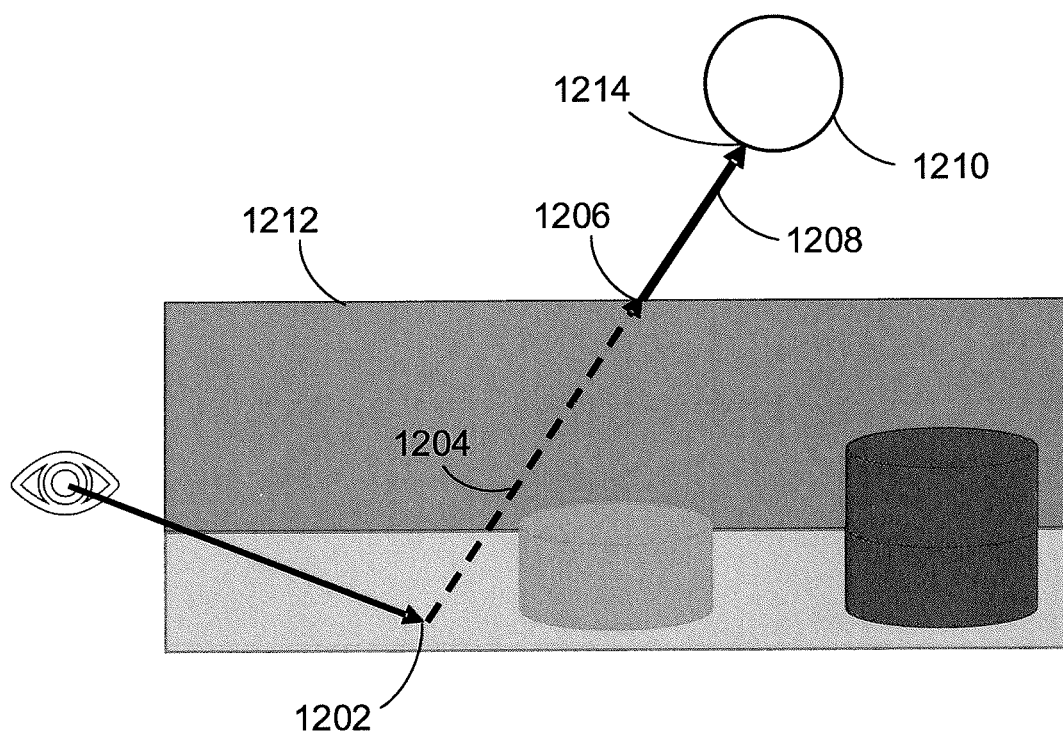
FIG. 12 is a block diagram illustrating performing ray tracing for rays that fail ray marching, according to one embodiment.

FIG. 12 is a block diagram illustrating performing ray tracing for rays that fail ray marching, according to one embodiment. As shown, a given pixel of a screen space image corresponds to point 1202 in a 3D scene. The point 1202 is located on an object, which happens to be a floor surface of the scene in the example in FIG. 12. A ray 1204 is ray marched from point 1202; however, the ray 1204 results in a ray marching failure, since the ray 1204 reaches the edge of the viewport 1212 without intersecting any other objects.

According to embodiments of the disclosure, a ray 1208 can be ray traced beginning at point 1206, which is the point at which ray marching reached the edge of the viewport 1212. In some cases, the ray traced ray 1208 intersects an object, such as object 1210. The color information from point 1214 where the ray traced ray 1208 intersects the object 1210 can be stored in a buffer to compute the color of the reflection at the pixel associated with point 1202. If the ray traced ray 1208 reaches a bounding box of the scene (not shown), then the ray traced ray 1208 is discarded and no color information can be obtained for the pixel associated with point 1202 based on the ray 1208.

Figure 13:
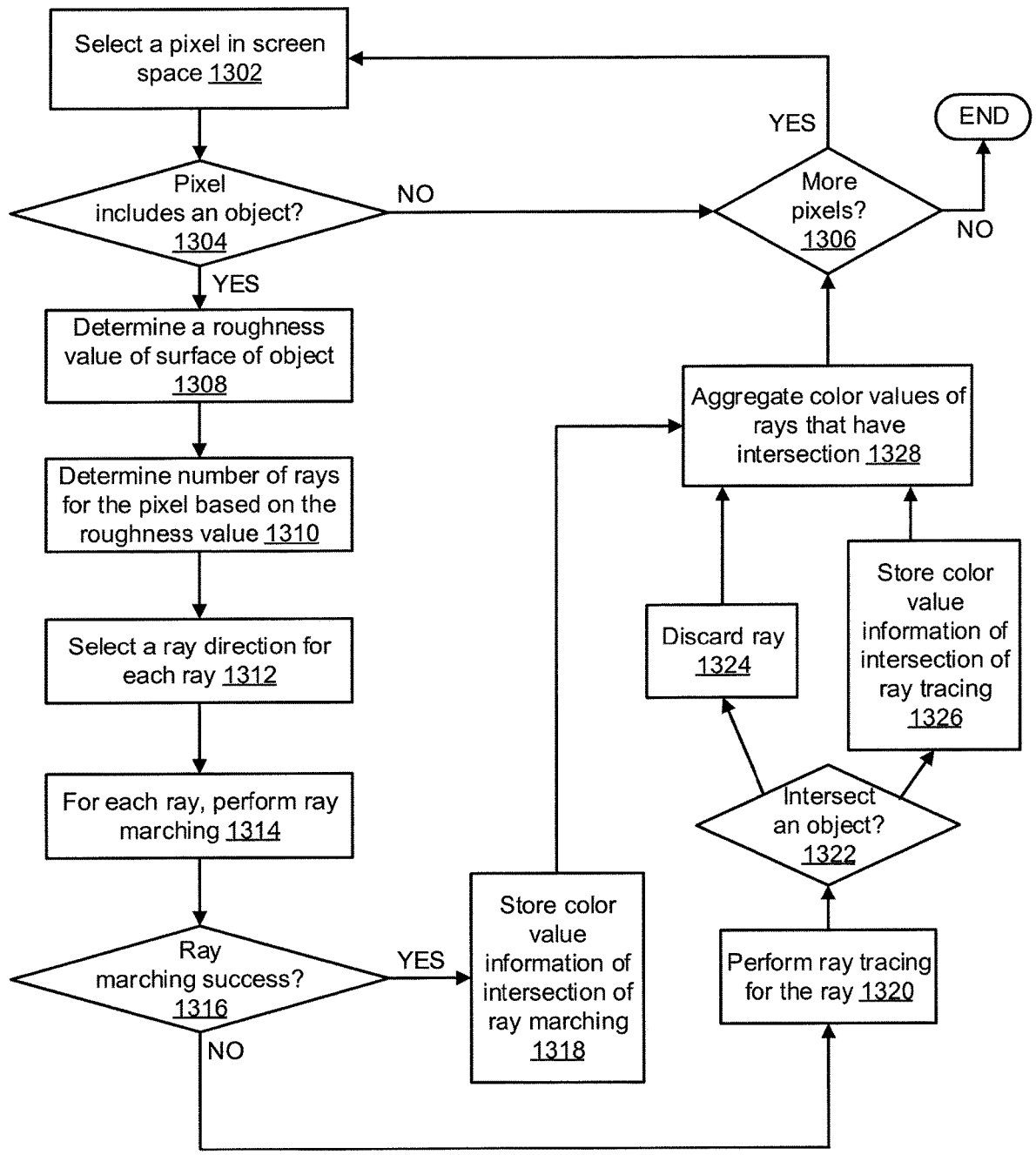
FIG. 13 is flow diagram of method steps for rendering reflections, according to one embodiment.

FIG. 13 is flow diagram of method steps for rendering reflections, according to one embodiment. FIG. 13 provides a hybrid ray marching and ray tracing technique, where ray marching is first used to find possible intersections in screen space. When ray marching fails, ray tracing is used.

At step 1302, a processor selects a pixel in screen space. The processor in FIG. 13 can be one or a combination of processor 110 and graphics processor 116 in FIG. 1. In one embodiment, screen space rasterization can be used to generate a 2D image of a scene in screen space. The method in FIG. 13 is used to add reflections to the pixels in the screen space image. The pixel selected at step 1302 can be any pixel in the screen space image.

At step 1304, the processor determines whether the pixel includes an object. In some cases, the pixel may include background (e.g., sky), and thus does not include any objects of the scene. If at step 1304, the processor determines that the pixel does not include an object, then no reflections are computed for the pixel, and the method proceeds to step 1306, where the processor determines whether there are any more pixels in screen space to process for reflections. If yes, the method returns to step 1302, where a different pixel is selected. In one implementation, each pixel is processed serially. However, in another implementation, each pixel in an image can be processed in parallel, e.g., by a graphics processor (e.g., GPU).

If, at step 1304, the processor determines that the pixel does include an object, the method proceeds to step 1308. At step 1308, the processor determines a roughness value of a surface of the object in the pixel. Rasterization of the 3D scene to a 2D image, in some embodiments, results in certain information being known about the objects associated with the pixels in the 2D image. Examples of such information include surface roughness and surface orientation. The surface roughness can be represented by a roughness value. For example, the roughness value may be a decimal value between 0.0 and 1.0.

At step 1310, the processor determines a number of rays to spawn for the pixel based on the roughness value. As described above, for smooth surfaces, just one ray is spawned. More rays can be spawned for rougher surfaces. In some implementations, the number of rays that are spawned is capped by a threshold limit, e.g., 4 rays per frame.

At step 1312, the processor selects a ray direction for each ray that is spawned. The ray direction of each ray is based on the surface orientation of the object in the pixel. For smooth surfaces (i.e., one ray is spawned), the direction of the ray can be determined based on simple mathematical reflection from the surface of the object.

In cases where multiple rays are spawned, a ray spawning algorithm can determine the direction of each ray that is spawned. In some implementations, a quasi-Monte Carlo technique can be used, i.e., deterministic random number generation for spawning rays. For example, for a given frame, four rays are determined to be spawned for the pixel based on the roughness value. The quasi-Monte Carlo technique can be used to determine the directions for the four rays. Each of the four rays has a direction that falls within a distribution of directions that are reachable based on the surface orientation.

Later, in a subsequent frame that includes a pixel that corresponds to the same surface of the same object, the quasi-Monte Carlo technique is again used to determine the direction of the rays to spawn, but selects directions that do not overlap with the directions selected for the rays in the previous frame(s). This process can be repeated for subsequent frames, thereby selecting different ray directions for different frames that have the same surface of the same object shown. By selecting different ray directions in different frames, different reflection information is computed for different frames. This may result in jittering reflections, as the reflections would look different from frame-to-frame for the same point. As described in greater detail below, the different reflection information over several frames can be aggregated over a series of frames. In this manner, less noisy results can be achieved, since the rays that are spawned for different frames have different directions (and thus, different reflection information) that can be aggregated together to form the reflection information.

Once the ray direction is determined (step 1312) for the one or more rays, at step 1314, the processor performs ray marching for each of the one or more rays. In one embodiment, ray marching involves examining each ray pixel-by-pixel to look for intersections. In another embodiment, an optimized ray marching method can be used, as described in FIG. 11.

At step 1316, the processor determines, for each ray, whether ray marching was a success or failure. For a given ray, if ray marching is a success, then at step 1318, the processor stores color value information of an intersection that the ray found via ray marching. For a given ray, if ray marching fails, then at step 1320, the processor performs ray tracing for the ray. As described, ray marching fails when the ray reaches an edge of the viewport without interacting with any objects. The ray that is ray traced can be begin from the edge of the viewport, since the processor knows there is no other intersection within the viewport (i.e., because ray marching failed).

At step 1322, for each ray that is ray traced, the processor determines whether the ray traced ray intersects an object in the 3D scene. As described, ray tracing can involve looking for intersections with all objects in the scene, not just the objects that are within the viewport.

For each ray traced ray that does not intersect any objects (e.g., reaches edge of bounding box of the scene), at step 1324, the processor discards the ray. No color information for reflections is therefore achieved for the ray.

For each ray traced ray that does intersect an object, at step 1326, the processor stores color value information of the intersection that the ray found via ray tracing.

At step 1328, the processor aggregates color values of the one or more rays that have intersection with objects in the scene. The color values could have been obtained via ray marching or ray tracing. In one embodiment, the color values are simply averaged together to determine a color value for the reflection at the pixel.

After step 1328, the method proceeds to step 1306, where the processor determines whether there are any more pixels in screen space to process for reflections, as described above.

In one embodiment, the method of FIG. 13 is used to generate primary reflections for each pixel in screen space in which an object is located. In one embodiment, secondary reflections can be generated using cube maps. In another embodiment, the secondary reflections can also be generated using the method of FIG. 13.

As described above, embodiments of the disclosure provide a system and method where reflections are generated by attempting to perform ray marching, and performing ray tracing if ray marching fails. Another embodiment, described below, provides a system and method to reuse ray marching results of nearby pixels for a given pixel.

Figure 14A:
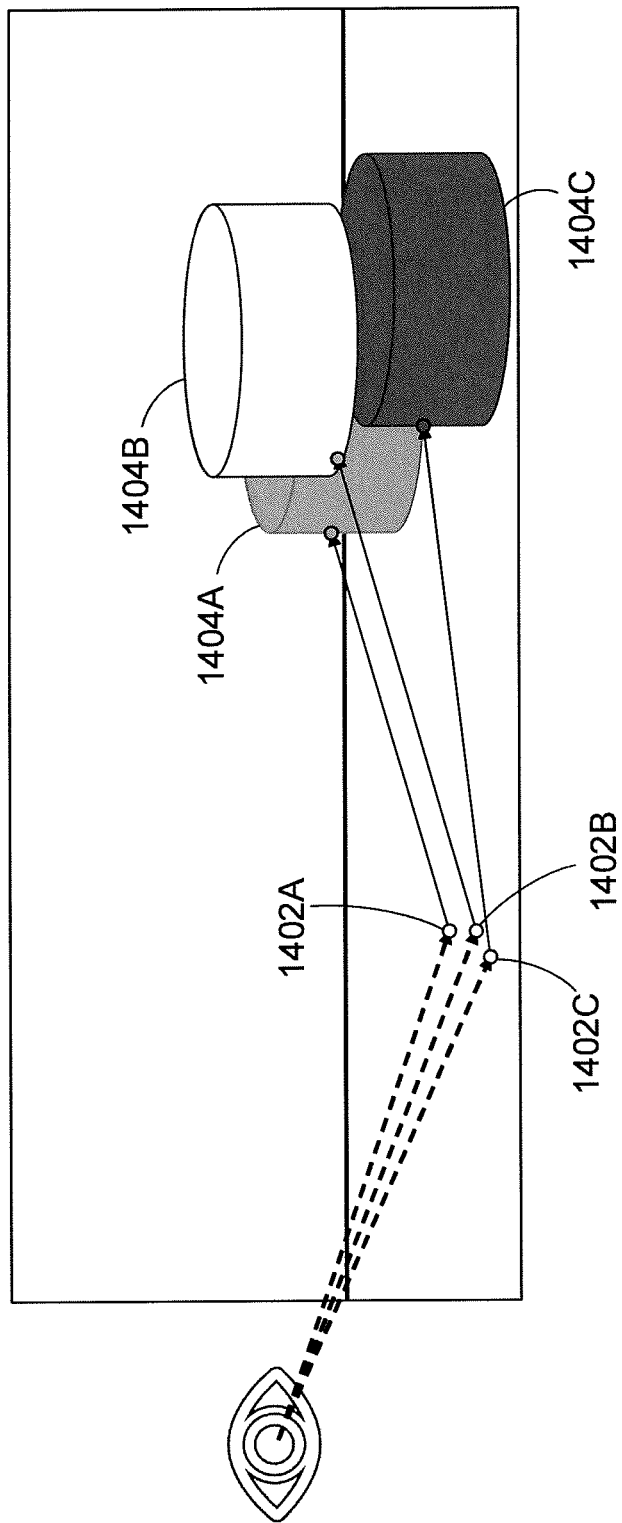
FIG. 14A is a block diagram illustrating a 3D (three-dimensional) scene, according to one embodiment.

FIG. 14A is a block diagram illustrating a 3D scene, according to one embodiment. The 3D scene can be rasterized to a 2D screen space. Three pixels of the 2D screen space are shown for reference. Pixel 1402A corresponds to a first point on a surface of an object in the scene (i.e., the object is the floor), pixel 1402B corresponds to a second point on a surface of an object in the scene, and pixel 1402C corresponds to a third point on a surface of an object in the scene. Suppose the method described in FIG. 13 is performed to determine the reflection information for pixel 1402B. Also suppose that based on the surface roughness of the object in pixel 1402B, three rays should be spawned to determine reflection information. Using the method in FIG. 13, three ray directions can be determined and separately ray marched, where if ray marching fails, the ray is re-cast via ray tracing, as described.

However, some embodiments of the disclosure can avoid spawning new rays, e.g., the three new rays for pixel 1402B, and, in some cases, can re-use information from nearby pixels to determine reflection information. In such embodiments, if nearby pixels (within a threshold radius) have a similar surface roughness (within a threshold roughness) and also have a similar surface orientation (within a threshold orientation), the ray marched and/or ray traced information from such neighboring pixels may be reused when determining the reflection color information for a given pixel. In some embodiments, an additional constraint may be that the object color information that is attempted to be reused should fall within a ray distribution reachable from the given pixel.

Figure 14B:
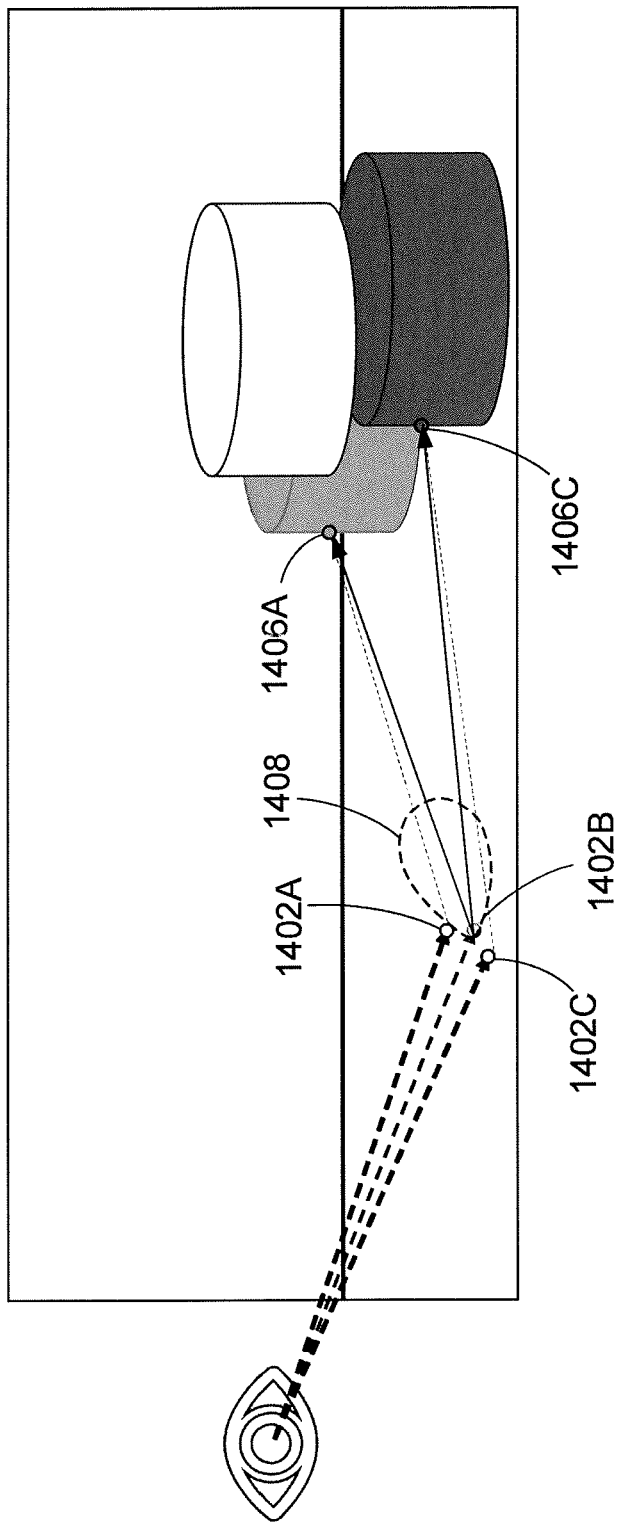
FIG. 14B is a block diagram illustrating the 3D scene in FIG. 14A with some rays being reused from neighboring pixels, according to one embodiment.

FIG. 14B is a block diagram illustrating the 3D scene in FIG. 14A with some rays being reused from neighboring pixels, according to one embodiment. As described, when attempting to determine reflection information for a given pixel (e.g., pixel 1402B), some reflection information from nearby pixels from previous frames may be reused. In the example shown, pixels 1402A and 1402C are within a threshold radius of pixel 1402B. The threshold radius may be configurable. In one implementation, the threshold radius is about 6-8 pixels in radius from the center pixel being examined. When computing the reflection information for pixel 1402A (in a previous frame or in the current frame), a ray was cast from pixel 1402A and was identified as intersecting an object at point 1406A. The intersection could have been found using ray marching or ray tracing, according to the method of FIG. 13. In the example shown in FIG. 14B, the intersection was found via ray marching, as the object of intersection is within the viewport. Similarly, when computing the reflection information for pixel 1402C (in a previous frame or in the current frame), a ray was cast from pixel 1402C and was identified as intersecting an object at point 1406C. As disclosed herein, instead of spawning multiple rays from pixel 1402B to determine the reflection information, some embodiments may reuse the color information from points 1406A and 1406C if certain conditions are satisfied.

In some embodiments, a first condition is that a difference between a surface roughness of the object associated with the pixel (i.e., 1402A or 1402C) that is the source of the potentially reusable information and the surface roughness of the object associated with pixel 1402B is within a threshold roughness. In some embodiments, the threshold roughness is configurable.

In some embodiments, a second condition is that a difference between a surface orientation of the object associated with the pixel (i.e., 1402A or 1402C) that is the source of the potentially reusable information and the surface orientation of the object associated with pixel 1402B is within a threshold orientation. In some embodiments, the threshold orientation is configurable.

In some embodiments, a third condition is that the potentially reusable information should be reachable from the pixel 1402B within a particular ray distribution 1408. In some embodiments, the set of potential ray directions of a primary reflection ray is dependent upon the angle from the object in the pixel to the camera and the surface roughness. An example ray distribution 1408 is shown in FIG. 14B. In one implementation, the ray distribution 1408 may be computed by a GGX Shading Model. A line can be draw from the sources of the potentially reusable information (i.e., from points 1406A, 1406C) to the object associated with pixel 1402B. As shown in FIG. 14B, the lines for both sources of potentially reusable information (i.e., from points 1406A, 1406C) are within the ray distribution 1408, thereby satisfying the third condition.

In various embodiments, one, two, or all three of the first, second, and third conditions can be used to determine whether data can be reused in this manner.

One embodiment, as described above, the reflection information determined by neighboring pixels that is reused was computed in a previous frame. In another embodiment, the reused information can be from the same frame, but from a pixel whose reflection information has already been computed.

Figure 15:
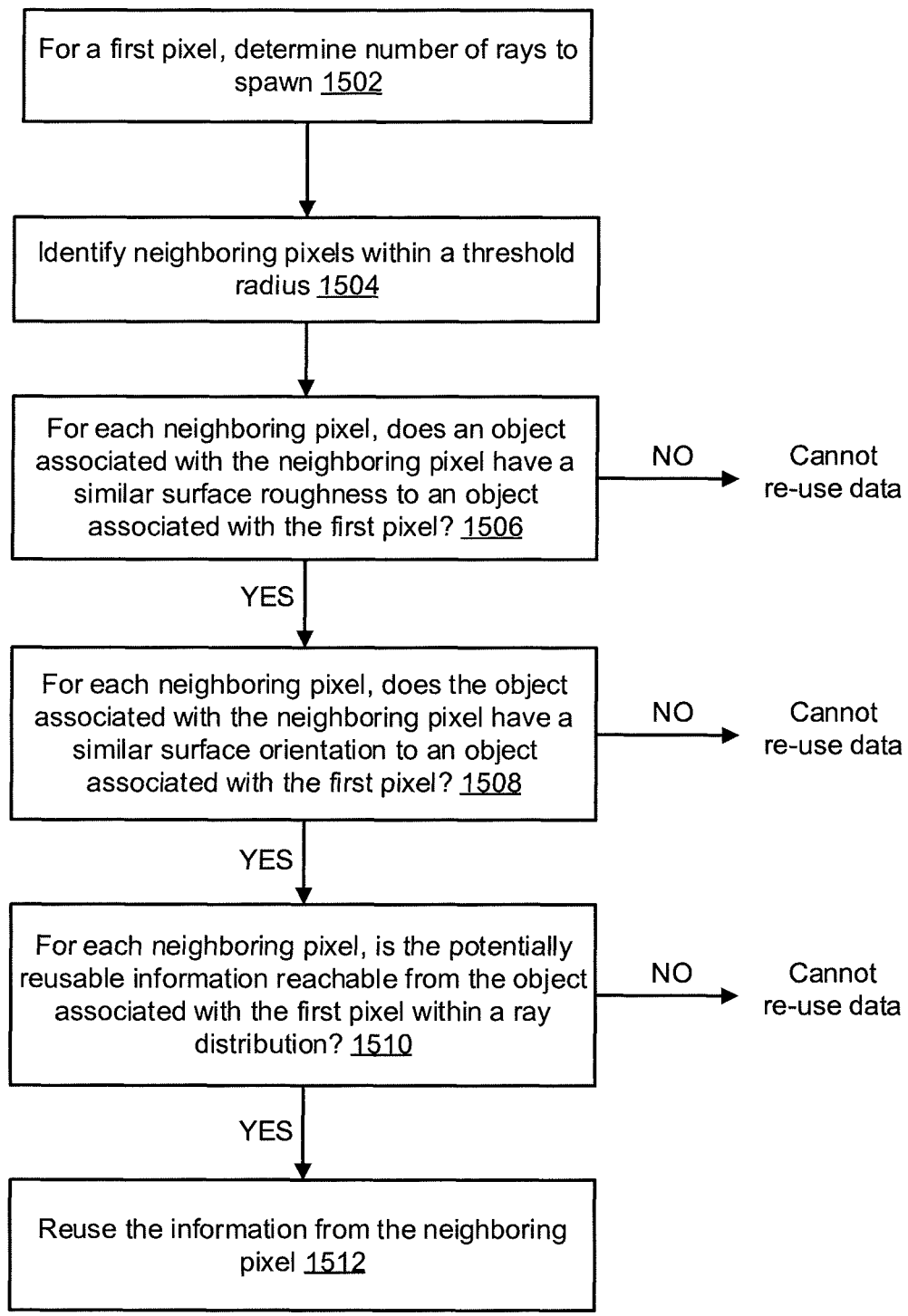
FIG. 15 is a flow diagram of method steps for reusing ray information of nearby pixels, according one embodiment.

FIG. 15 is a flow diagram of method steps for reusing ray information of nearby pixels, according one embodiment. At step 1502, for a first pixel, a processor determines a number of rays to spawn. The processor in FIG. 15 can be one or a combination of processor 110 and graphics processor 116 in FIG. 1. As described above, in some embodiments, the number of rays to spawn is based on the surface roughness of an object associated with the first pixel. At step 1504, the processor identifies neighboring pixels within a threshold radius of the first pixel. In one embodiment, the threshold radius is configurable. In one embodiment, each neighboring pixel within the threshold radius is examined to attempt to find reusable reflection information. In another embodiment, the neighboring pixels within the threshold radius are examined until enough reusable information is located, at which point no additional neighboring pixels are examined.

At step 1506, for a given neighboring pixel, the processor determines whether an object associated with the neighboring pixel has a similar surface roughness to an object associated with the first pixel. If not, then the reflection information from the neighboring pixel is not reused. If yes, the method proceeds to step 1508.

At step 1508, for a given neighboring pixel, the processor determines whether the object associated with the neighboring pixel has a similar surface orientation to the object associated with the first pixel. If not, then the reflection information from the neighboring pixel is not reused. If yes, the method proceeds to step 1510.

At step 1510, for a given neighboring pixel, the processor determines whether the potentially reusable information is reachable from the object associated with the first pixel within a ray distribution. If not, then the reflection information from the neighboring pixel is not reused. If yes, the method proceeds to step 1512.

At step 1512, the processor reuses the reflection information from the neighboring pixel.

Although steps 1506, 1508, 1510 are shown in a particular order, in other embodiments the steps 1506, 1508, 1510 can be performed in any order. Also, in some embodiments, one or more of the steps 1506, 1508, 1510 is optional and can be omitted.

In one embodiment, in a first frame, reflections for every other pixel (or some set of pixels) of an image are generated using the method of FIG. 13. For example, if the image was represented by a black-and-white checkerboard pattern, the method of FIG. 13 is applied to just the pixels represented by white checkers (i.e., every other pixel). For the pixels represented by black checkers, the ray re-use technique of FIG. 15 can be used to generate reflection information for those pixels. In the next frame, the computations are reversed, and the method of FIG. 13 is performed to generate reflection information for the pixels represented by black checkers and the ray re-use technique of FIG. 15 is performed to generate reflection information for the pixels represented by white checkers. In this manner, for each frame there is a full-resolution of reflection information for the frame, but only half as many rays are needed.

In some implementations, reflections can be added to each pixel of an image using the method of FIG. 13, with or without the ray re-use of FIG. 15. In some cases, the reflection results across the entire frame may exhibit noise, particularly when the scene includes glossy reflections. As such, some embodiments can smooth out the noise by performing temporal filtering.

FIG. 16A is an example of a reflection, according to one embodiment. A given pixel in screen space may correspond to a point 1602 on an object. A reflection ray can be spawned from the pixel associated with point 1602 and may intersect another object at point 1604. Color information from point 1604 can be used to add reflection information to the pixel associated with point 1602. A projected point 1606 can also be computed for point 1604 in a virtual reflection realm, relative to a virtual position 1608A of the eye/camera for a given frame.

Figure 16B:
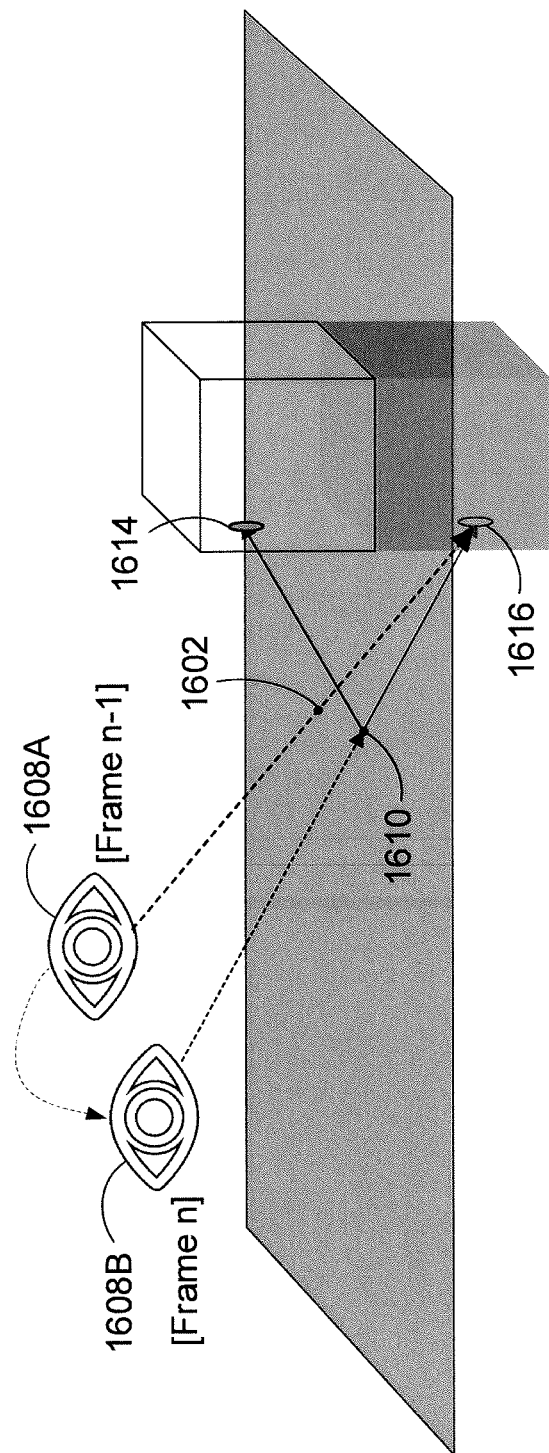
FIG. 16B illustrates a line from the projected point to an updated virtual position of an eye/camera, according to one embodiment.

In a subsequent frame, as shown in FIG. 16B, the virtual position 1608B of the camera/eye has moved to a different location. A given pixel in screen space in the updated virtual position 1608B of the camera/eye may correspond to a point 1610 on an object. A reflection ray can be spawned from the pixel associated with point 1610 and may intersect an object at point 1614. A projected point 1616 can be computed for point 1614 in the virtual reflection realm, relative to the updated virtual position 1608B of the eye/camera for a given frame. In FIG. 16B, a line from the projected point 1616 to the updated virtual position 1608B of the eye/camera passes through point 1610.

In some embodiments, the processor may be configured to determine whether point 1602 in previous frame (FIG. 16A) has a similar surface roughness to point 1610 in a subsequent frame (FIG. 16B). If the surface roughness values of points 1602 and 1610 are within a threshold difference, then reflection results for the two frames can be blurred together, referred to as temporal filtering. This is because both points 1602 and 1610 correspond to a reflection representing the same portion of an object. Temporal filtering can be repeated for each pixel of an image frame-to-frame. The result, in some implementations, is a smoother representation of the reflections with less noise. However, in some cases, the processor may determine there is a low confidence that the reflection results for the two frames can be blurred together. For example, if the surface roughness values of points 1602 and 1610 are different enough that they exceed the threshold, reflection results for the two frames cannot be blurred together. Also, if another object has moved in front of the original reflection intersection (e.g., point 1604 in FIG. 16A), reflection results for the two frames cannot be blurred together.

Figure 17:
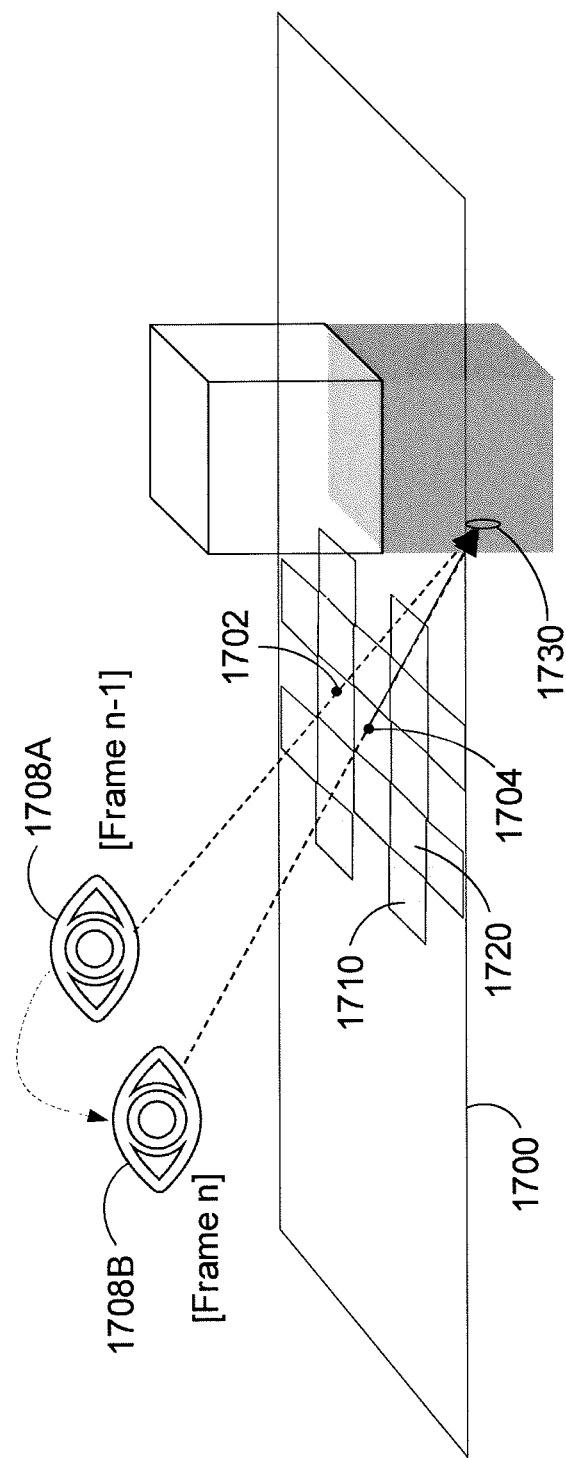
FIG. 17 is a block diagram illustrating two points in subsequent frames that have different surface roughness values, according to one embodiment.

FIG. 17 is a block diagram illustrating two points in subsequent frames that have different surface roughness values, according to one embodiment. Suppose the surface of object 1700 (i.e., the floor) has a checkboard pattern with alternating areas of rough surfaces 1710 and smooth surfaces 1720. In a first frame, a line from a point 1730 in the virtual reflection realm to a first virtual position 1708A of the eye/camera passes though point 1702, which corresponds to a rough surface 1710. In a second frame, a line from the point 1730 in the virtual reflection realm to a second virtual position 1708B of the eye/camera passes though point 1704, which corresponds to a smooth surface 1720. In this case, reflection results for the two frames cannot be blurred together because the surface roughness values of points 1702 and 1704 are not within a threshold difference of one another.

In the examples shown in FIGS. 16A-16B, a single reflection ray is shown. Such an implementation may correspond to smooth surfaces that result in specular reflections. For rough surfaces where multiple rays are spawned to generate glossy reflections, an average position of intersection of an object by the multiple rays can be computed and the process described above can be repeated based on the average position of the intersection of the object by the multiple rays.

Figure 18:
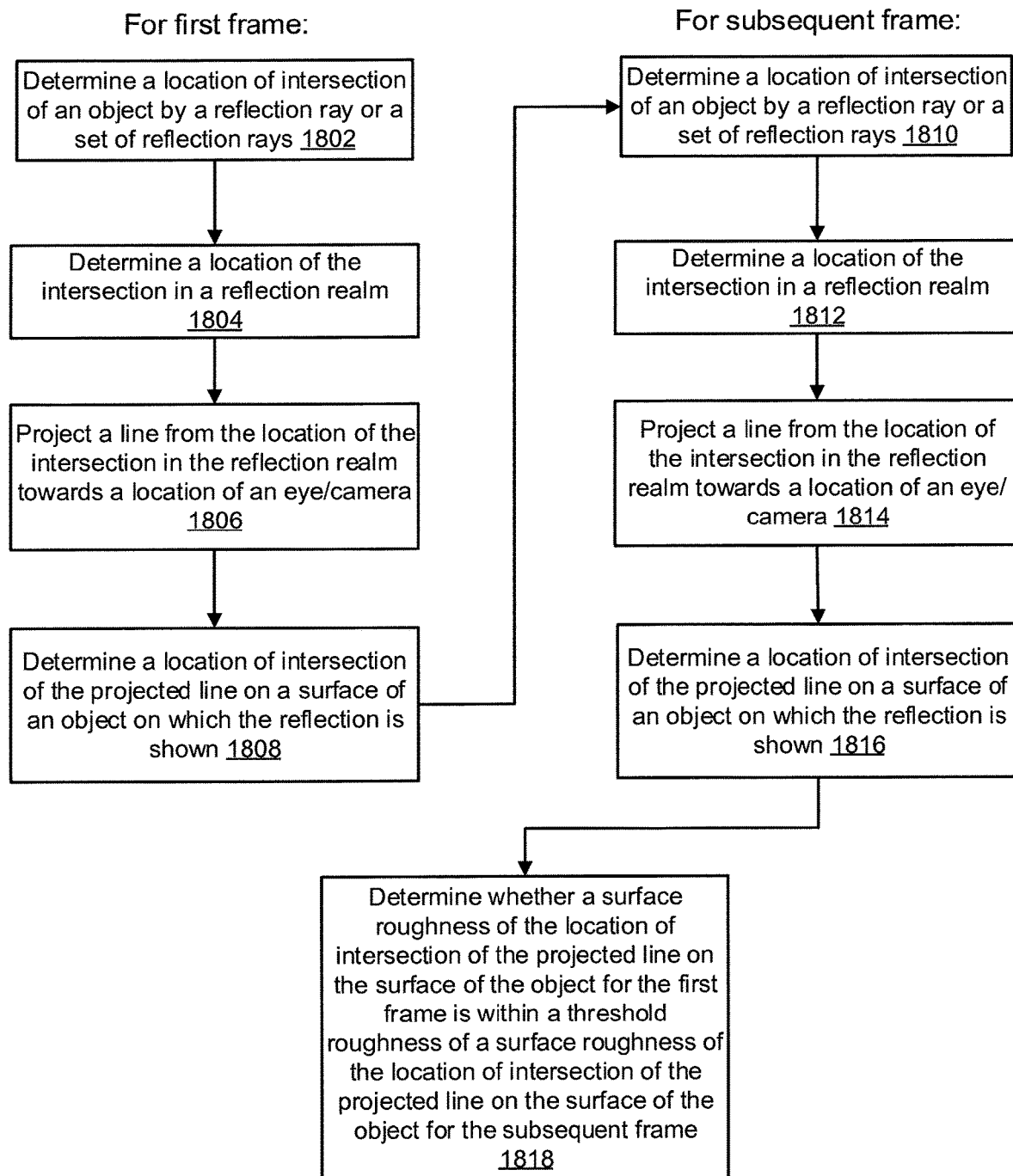
FIG. 18 is a flow diagram of method steps for performing temporal filtering, according to one embodiment.

FIG. 18 is a flow diagram of method steps for performing temporal filtering, according to one embodiment. For a first frame, at step 1802, a processor determines a location of intersection of an object by a reflection ray or a set of reflection rays. The processor in FIG. 18 can be one or a combination of processor 110 and graphics processor 116 in FIG. 1. In various embodiments, the location of intersection can be a single location from a single reflection ray, or can be an average location of intersection based on multiple reflection rays that intersect the object. In another embodiment, multiple locations of intersection can be computed, such as when multiple reflection rays intersect an object.

At step 1804, the processor determines a location of the intersection in a reflection realm. At step 1806, the processor projects a line from the location of the intersection in the reflection realm towards a location of an eye/camera. At step 1808, the processor determines a location of intersection of the projected line on a surface of an object on which the reflection is shown.

For a subsequent frame, the processor determines a location of intersection of an object by a reflection ray or a set of reflection rays (step 1810), determines a location of the intersection in a reflection realm (step 1812), projects a line from the location of the intersection in the reflection realm towards a location of an eye/camera (step 1814), and determines a location of intersection of the projected line on a surface of an object on which the reflection is shown (step 1816). Steps 1810, 1812, 1814, 1816 are similar to steps 1802, 1804, 1806, 1808, respectively, but for a subsequent frame.

At step 1818, the processor determines whether a surface roughness of the location of intersection of the projected line on the surface of the object for the first frame is within a threshold difference of a surface roughness of the location of intersection of the projected line on the surface of the object for the subsequent frame. If the surface roughness of the locations of intersection of the projected lines for the first frame and the subsequent frame are within a threshold difference, the reflection information can be blurred together to generate smoother reflections.

In some embodiments, additional criteria is examined before determining that the reflection information can be blurred together. For example, the color information of the location of intersection of the object by the reflection ray or the set of reflection rays from a first frame and the subsequent frame can be compared, for example, to determine whether it is the same object being reflected in both frames or if the object changed colors. The process described in FIG. 18 refers to a single location of intersection. The process can be repeated for multiple locations of intersection.

As described above, some reflections may be specular reflections and some reflections may be glossy reflections. Some glossy reflections may also be stretched reflections.

Figure 19:
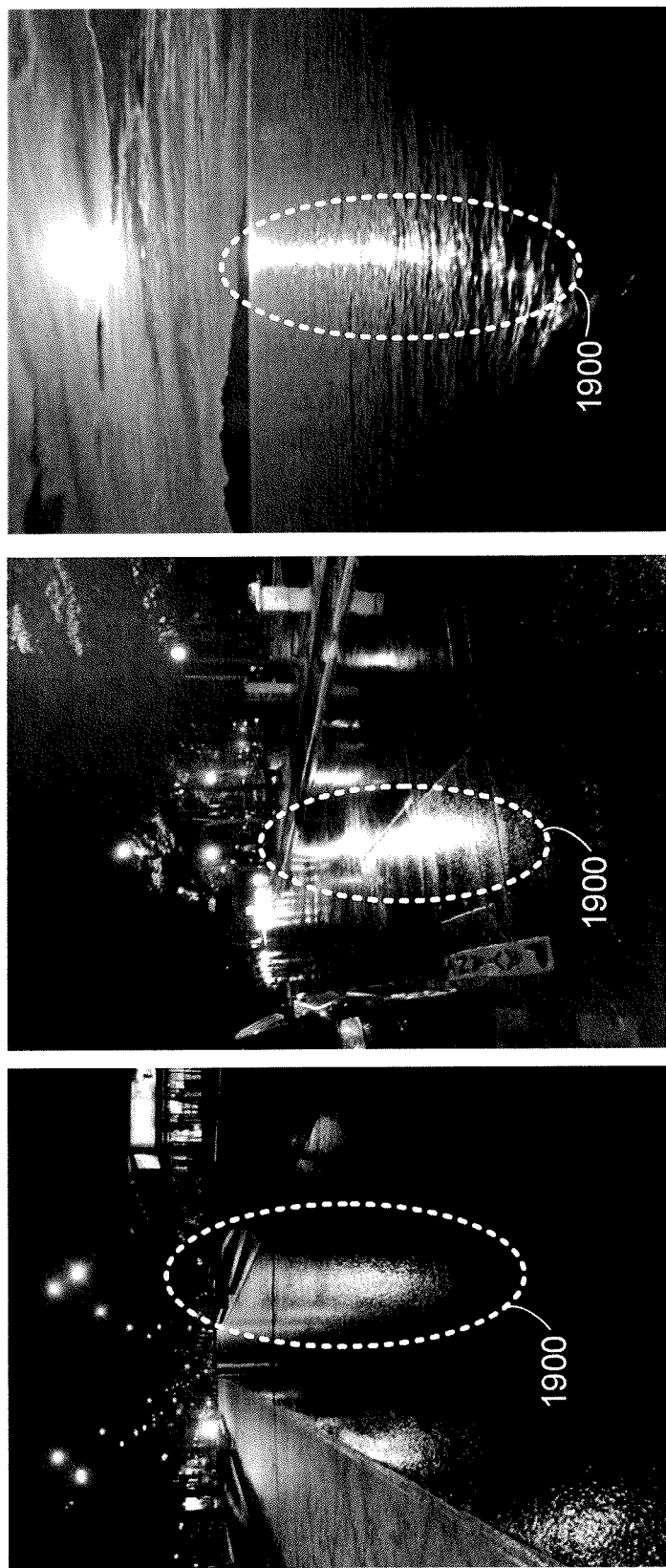
FIG. 19 illustrates examples of stretched reflections.
Figure 20:
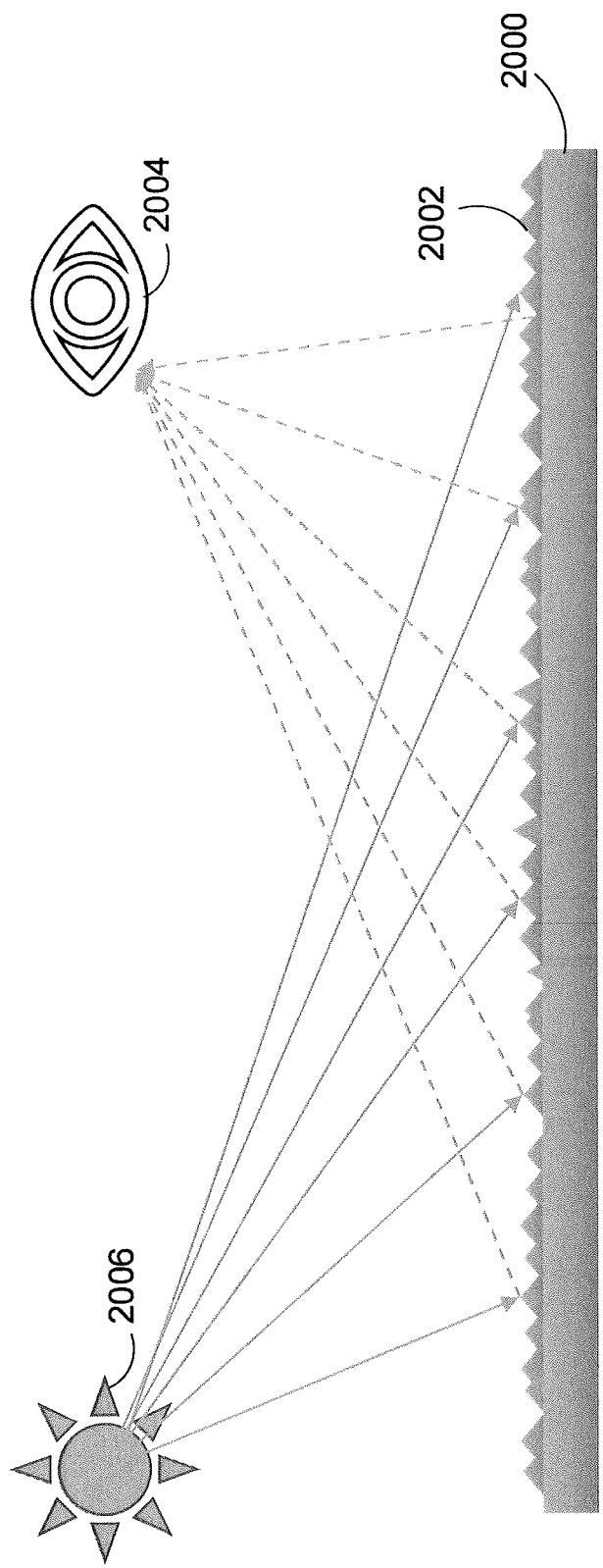
FIG. 20 is a block diagram explaining stretched reflections, according to one embodiment.
Figure 21:
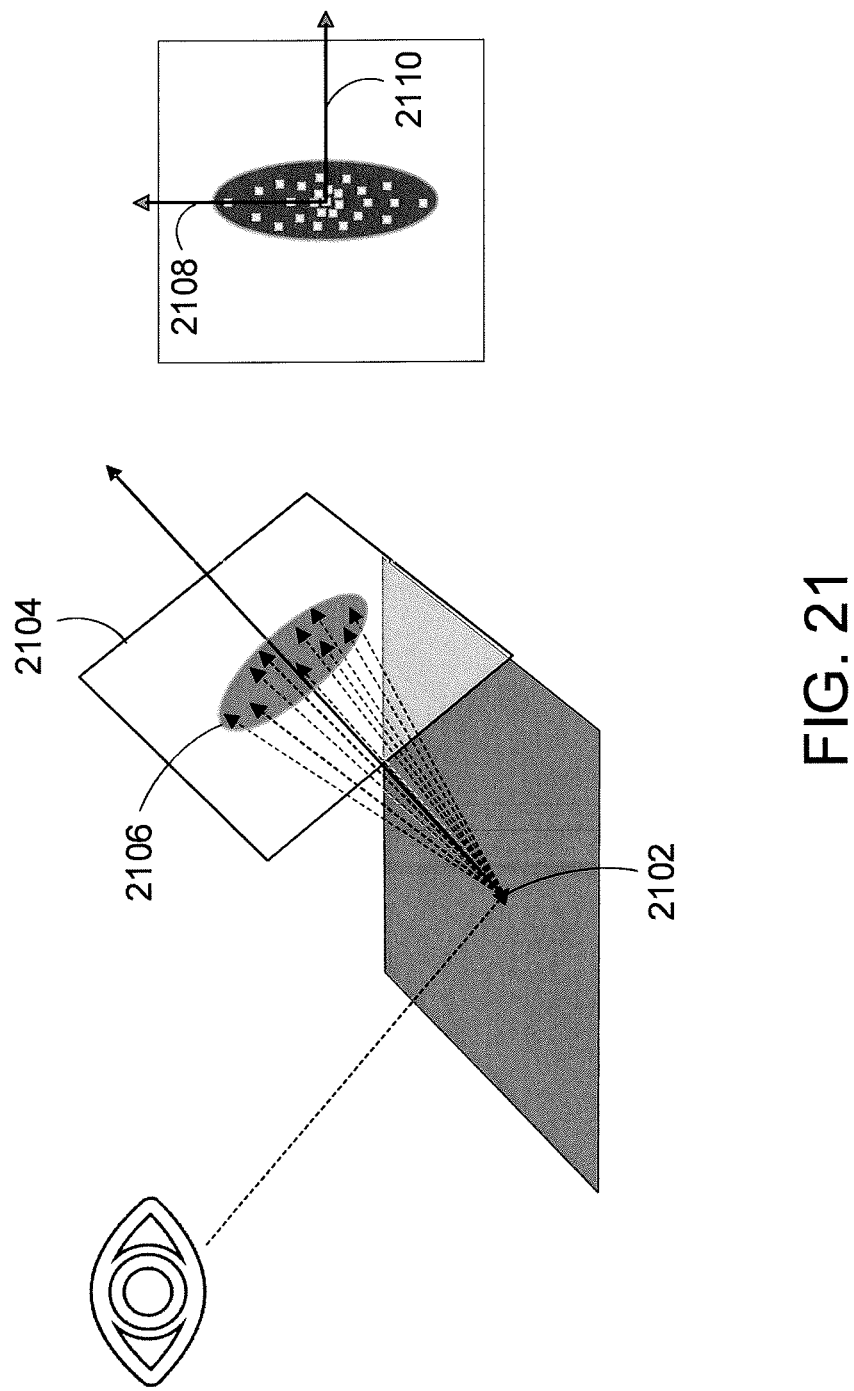
FIG. 21 is an example of a stretched reflection, according to one embodiment.

FIG. 19 illustrates examples of stretched reflections 1900. FIG. 20 is a block diagram explaining stretched reflections, according to one embodiment. A rough surface 2000 includes a plurality of mircofacets 2002, which result in glossy reflections. Based on the grazing angle of the eye/camera 2004 relative to the light source 2006 (or source of reflection information), the glossy reflection may become stretched out. The shape of the stretched reflection generally takes the form of an ellipse, as shown in FIG. 21. Reflection data that falls within the ellipse can be blurred together by a blurring kernel that has the shape and size of the ellipse to generate the reflection information for the pixels within the ellipse. In some embodiments, the blurring kernel can set weights for how much contribution a given piece of reflection information provides to the overall results. In some implementations, reflection information closer to the center of the ellipse can be weighted more heavily (i.e., has a greater impact) on the reflection result than reflection information closer to the edge of the ellipse.

Figure 23:
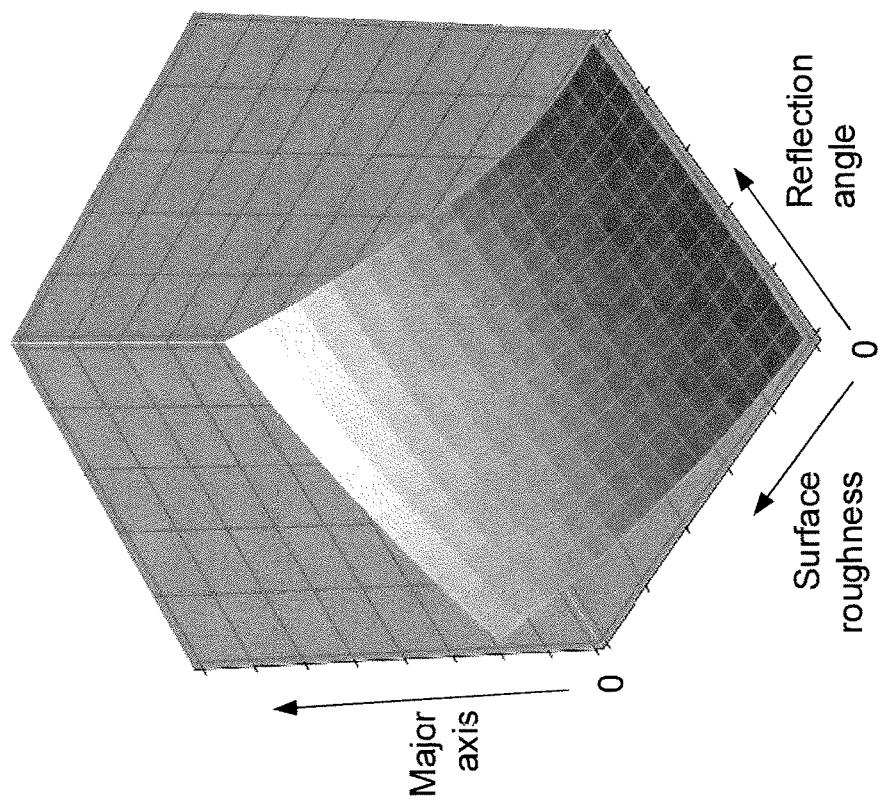
FIG. 23 is a plot of a pre-computed length of a major axis of an ellipse representing stretched reflections, according to one embodiment.
Figure 22:
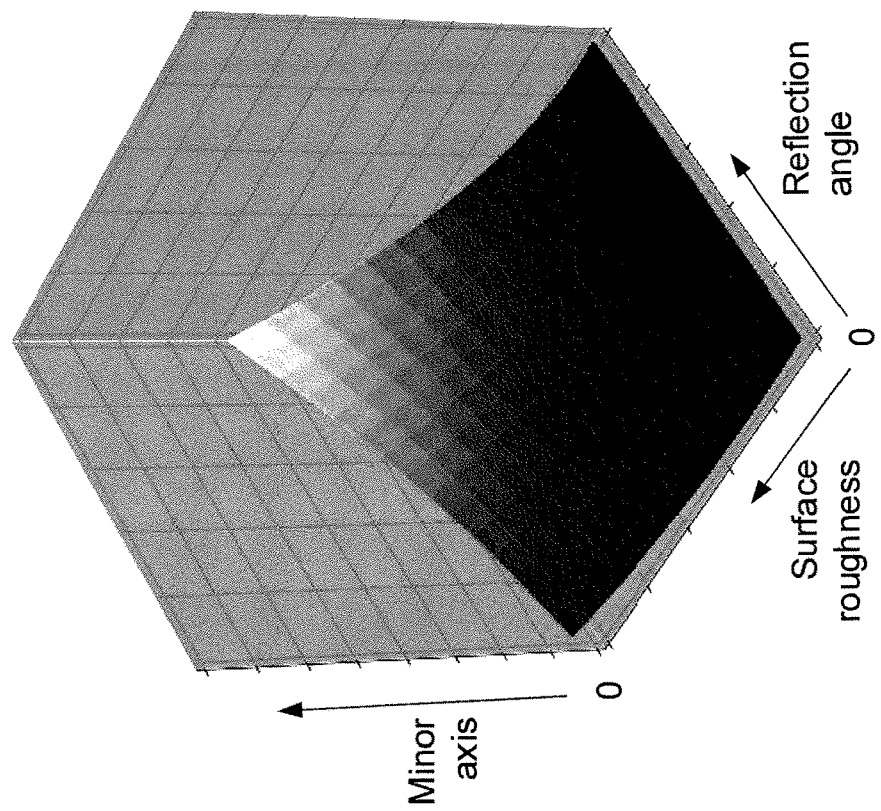
FIG. 22 is a plot of a pre-computed length of a minor axis of an ellipse representing stretched reflections, according to one embodiment.

FIG. 21 is an example of a stretched reflection, according to one embodiment. A reflection seen at point 2102 from an object 2104 may take the form of an ellipse 2106. The ellipse 2106 has a major axis 2108 and a minor axis 2110. The lengths of major axis 2108 and minor axis 2110 can be pre-computed and stored in a look-up table based on the surface roughness and reflection angle. In one implementation, the ellipse axis are for a unit length vector (i.e., length of 1). As such, the size of the ellipse can be linearly scaled based on average ray length and the projection, as described below. FIG. 22 is a plot of a pre-computed length of a minor axis of an ellipse representing stretched reflections based on the surface roughness and reflection angle, according to one embodiment. FIG. 23 is a plot of a pre-computed length of a major axis of an ellipse representing stretched reflections based on the surface roughness and reflection angle, according to one embodiment.

Figure 24:
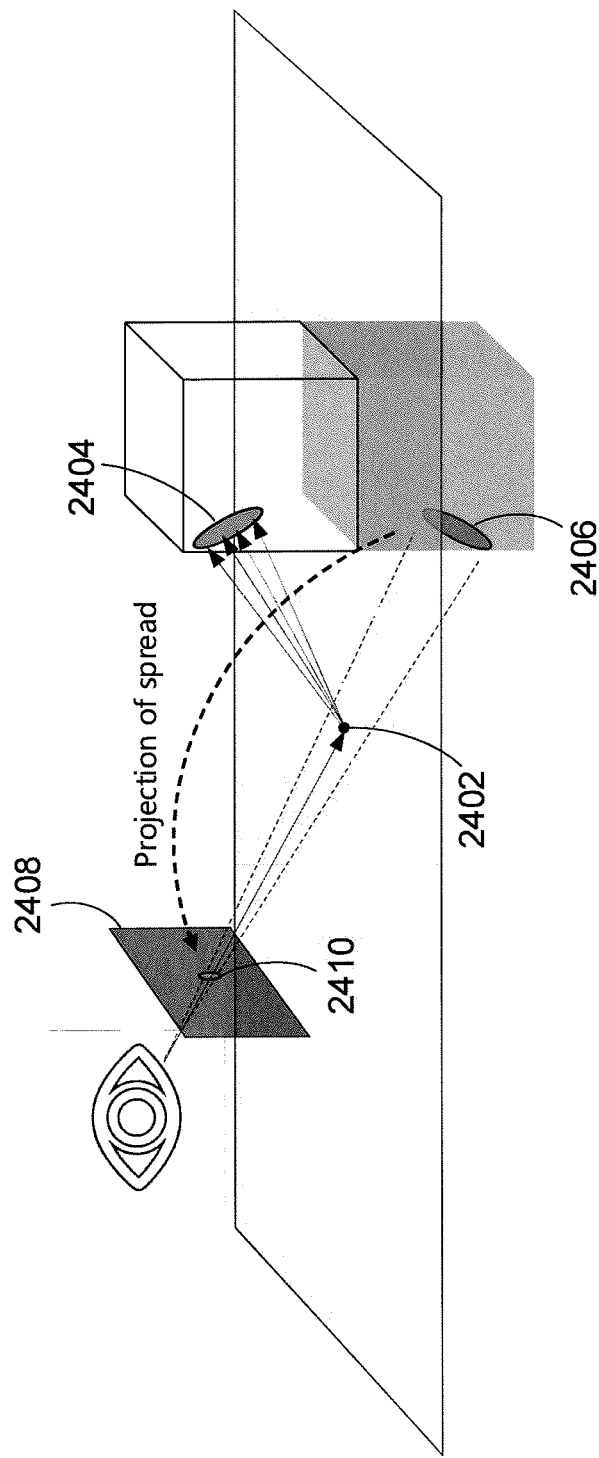
FIG. 24 is an example of applying an elliptical filter for glossy reflections, according to one embodiment.

FIG. 24 is an example of applying an elliptical filter for glossy reflections, according to one embodiment. As shown, the reflection at point 2402 takes on an elliptical shape based on the surface roughness and reflection angle. Reflection information from a nearby object is shown as ellipse 2404 on the object. A location for the reflection information in the reflection realm can be computed and located at ellipse 2406. The ellipse 2406 is projected into screen space 2408 and is scaled as ellipse 2410. Reflection information within ellipse 2410 in screen space can be blurred together using a blurring kernel to arrive at the final reflection information.

Figure 25:
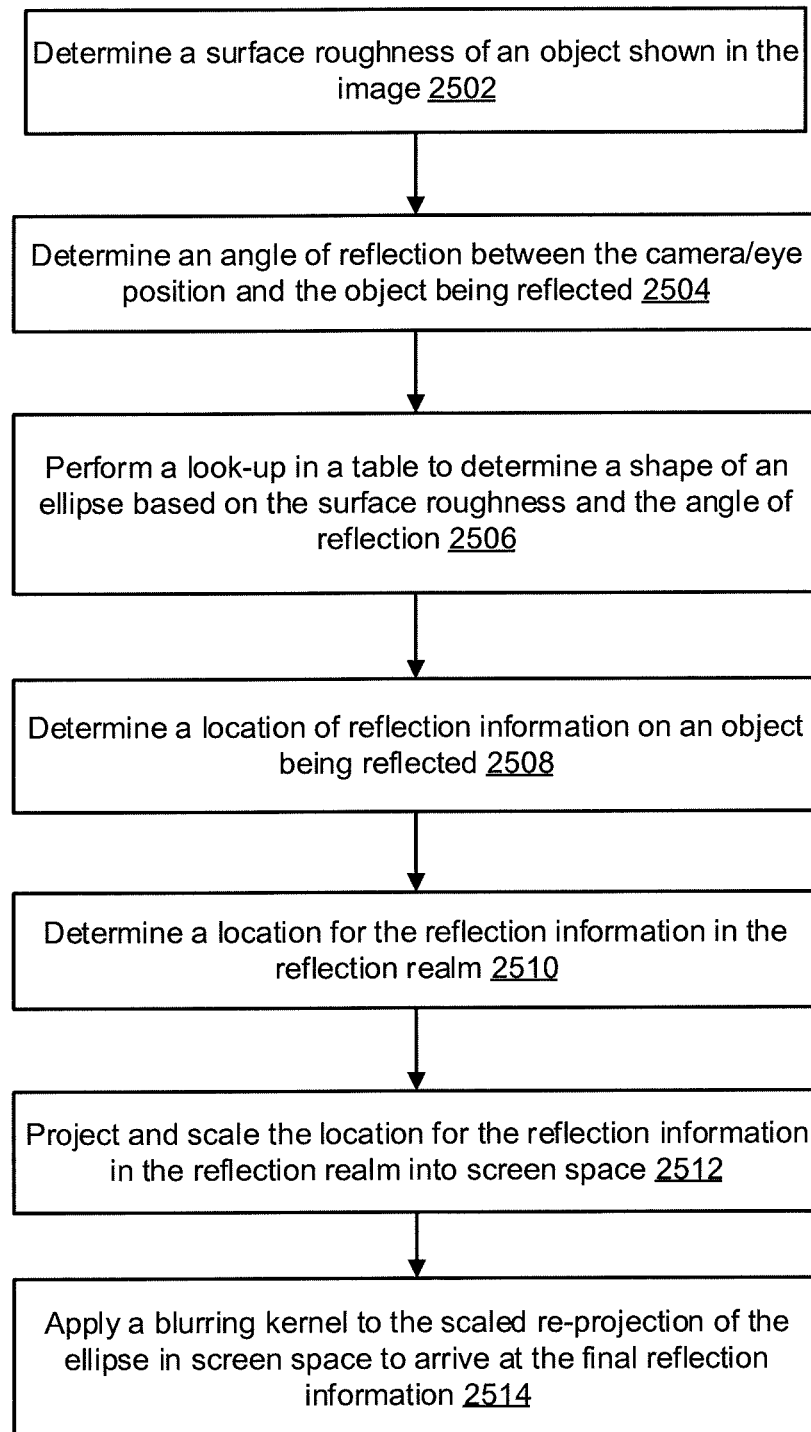
FIG. 25 is a flow diagram of applying an elliptical filter, according to one embodiment.

FIG. 25 is a flow diagram of applying an elliptical filter, according to one embodiment. At step 2502, for a given image, a processor determines a surface roughness of an object shown in the image. The processor in FIG. 25 can be one or a combination of processor 110 and graphics processor 116 in FIG. 1. The surface roughness may be indicative of a rough surface that results in glossy reflections.

At step 2504, the processor determines an angle of reflection between the camera/eye position and the object being reflected. At step 2506, the processor performs a look-up in a table to determine a shape of an ellipse based on the surface roughness and the angle of reflection. The ellipse may have a major axis and a minor axis.

At step 2508, the processor determines a location of reflection information on an object being reflected. The location of the reflection information takes the form of an ellipse. At step 2510, the processor determines a location for the reflection information in the reflection realm. The location of reflection information in the reflection realm also takes the form of an ellipse.

At step 2512, the processor projects and scales the location for the reflection information in the reflection realm into screen space. At step 2514, the processor applies a blurring kernel to the scaled projection of the ellipse in screen space to arrive at the final reflection information. In some embodiments, the blurring kernel can set weights for how much contribution a given piece of reflection information provides to the overall results. In some implementations, reflection information closer to the center of the ellipse can be weighted more heavily (i.e., has a greater impact) on the reflection result than reflection information closer to the edge of the ellipse. In another embodiment, when selecting the ray directions over a series of frames, more rays at the center of the ellipse can be selected. As such, each ray can have equal weighting, but since more rays are clustered in the center of the ellipse, the weighing is implicit (i.e., so-called "importance sampling").

Another embodiment may generate a plurality of points within the ellipse that is used during the blurring stage. The temporal filtering (FIG. 18) can be applied to each of these points to lookup each of those points in the previous frame. A selected number of points (e.g., 4-5 points) with the highest weights then be used for blurring. Doing so could enhance the quality of the temporal filtering.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for generating reflection information, the method comprising:
   projecting, for a first frame, a first reflection ray that originates at a first point on a surface of a first object, wherein a direction of the first reflection ray is based on a surface orientation of the surface of the first object at the first point that corresponds to a first pixel in screen space;
   determining, for the first frame, a location of intersection of the first reflection ray on a second object;
   determining, for the first frame, a first reflection realm location in a virtual reflection realm, wherein the first reflection realm location is a first virtual location on a first virtual object in the virtual reflection realm, and wherein the first reflection realm location corresponds to a projection, into the virtual reflection realm, that is based on the location of intersection of the first reflection ray on the second object and a first location of a camera for the first frame;
   projecting, for the first frame, a first line from the first reflection realm location towards the first location of the camera;
   determining, for the first frame, a location of intersection of the first line on a surface of the first object;
   projecting, for a second frame, a second reflection ray that originates at a second point on a surface of a third object, wherein a direction of the second reflection ray is based on a surface orientation of the surface of the third object at the second point that corresponds to a second pixel in screen space;
   determining, for the second frame, a location of intersection of the second reflection ray on a fourth object, wherein the second frame is subsequent to the first frame;
   determining, for the second frame, a second reflection realm location in the virtual reflection realm, wherein the second reflection realm location is a second virtual location on a second virtual object in the virtual reflection realm, and wherein the second reflection realm location corresponds to a projection, into the virtual reflection realm, that is based on the location of intersection of the second reflection ray on the fourth object and a second location of the camera for the second frame;
   projecting, for the second frame, a second line from the second reflection realm location towards the second location of the camera;
   determining, for the second frame, a location of intersection of the second line on a surface of the third object;
   determining that a surface roughness of the location of intersection of the second line on the surface of the third object is within a threshold roughness of a surface roughness of the location of intersection of the first line on the surface of the first object; and
   generating reflection information for the second point based on reflection information for the first point.

2. The method according to claim 1, wherein the first object and the third object comprise the same object.

3. The method according to claim 1, wherein generating the reflection information for the second point comprises blurring reflection information for the first point with reflection information determined for the second point.

4. The method according to claim 1, wherein the location of intersection of the first reflection ray on the second object comprises an aggregated location based on a plurality of reflection rays.

5. The method according to claim 1, further comprising:
determining to spawn multiple reflection rays that originate at the first point based on a surface roughness of the first object; and
performing a look-up in a database to determine a shape of an ellipse based on the surface roughness of the first object and the first location of the camera;
wherein the location of intersection of the multiple reflection rays on the second object is based on the shape of the ellipse.

6. The method according to claim 5, wherein performing the look-up in the database comprises obtaining data for a major axis of the ellipse and obtaining data for a minor axis of the ellipse.

7. The method according to claim 1, wherein the first reflection realm location is a same location in the virtual reflection realm as the second reflection realm location.

8. A non-transitory computer-readable storage medium storing instructions that, when executed by one or more processors, cause a computing device to generate reflection information, by performing the steps of:
projecting, for a first frame, a first reflection ray that originates at a first point on a surface of a first object, wherein a direction of the first reflection ray is based on a surface orientation of the surface of the first object at the first point that corresponds to a first pixel in screen space;
determining, for the first frame, a location of intersection of the first reflection ray on a second object;
determining, for the first frame, a first reflection realm location in a virtual reflection realm, wherein the first reflection realm location is a first virtual location on a first virtual object in the virtual reflection realm, and wherein the first reflection realm location corresponds to a projection, into the virtual reflection realm, that is based on the location of intersection of the first reflection ray on the second object and a first location of a camera for the first frame;
projecting, for the first frame, a first line from the first reflection realm location towards the first location of the camera;
determining, for the first frame, a location of intersection of the first line on a surface of the first object;
projecting, for a second frame, a second reflection ray that originates at a second point on a surface of a third object, wherein a direction of the second reflection ray is based on a surface orientation of the surface of the third object at the second point that corresponds to a second pixel in screen space;
determining, for the second frame, a location of intersection of the second reflection ray on a fourth object, wherein the second frame is subsequent to the first frame;
determining, for the second frame, a second reflection realm location in the virtual reflection realm, wherein the second reflection realm location is a second virtual location on a second virtual object in the virtual reflection realm, and wherein the second reflection realm location corresponds to a projection, into the virtual reflection realm, that is based on the location of intersection of the second reflection ray on the fourth object and a second location of the camera for the second frame;
projecting, for the second frame, a second line from the second reflection realm location towards the second location of the camera;
determining, for the second frame, a location of intersection of the second line on a surface of the third object;
determining that a surface roughness of the location of intersection of the second line on the surface of the third object is within a threshold roughness of a surface roughness of the location of intersection of the first line on the surface of the first object; and
generating reflection information for the second point based on reflection information for the first point.

9. The computer-readable storage medium according to claim 8, wherein the first object and the third object comprise the same object.

10. The computer-readable storage medium according to claim 8, wherein generating the reflection information for the second point comprises blurring reflection information for the first point with reflection information determined for the second point.

11. The computer-readable storage medium according to claim 8, wherein the location of intersection of the first reflection ray on the second object comprises an aggregated location based on a plurality of reflection rays.

12. The computer-readable storage medium according to claim 8, the steps further comprising:
determining to spawn multiple reflection rays that originate at the first point based on a surface roughness of the first object; and
performing a look-up in a database to determine a shape of an ellipse based on the surface roughness of the first object and the first location of the camera;
wherein the location of intersection of the multiple reflection rays on the second object is based on the shape of the ellipse.

13. The computer-readable storage medium according to claim 12, wherein performing the look-up in the database comprises obtaining data for a major axis of the ellipse and obtaining data for a minor axis of the ellipse.

14. The computer-readable storage medium according to claim 8, wherein the first reflection realm location is a same location in the virtual reflection realm as the second reflection realm location.

15. A device for generating reflection information, the device comprising:
a memory storing instructions; and
one or more processors configured to the execute the instructions to cause the device to:
project, for a first frame, a first reflection ray that originates at a first point on a surface of a first object, wherein a direction of the first reflection ray is based on a surface orientation of the surface of the first object at the first point that corresponds to a first pixel in screen space;
determine, for the first frame, a location of intersection of the first reflection ray on a second object;
determine, for the first frame, a first reflection realm location in a virtual reflection realm, wherein the first reflection realm location is a first virtual location on a first virtual object in the virtual reflection realm, and wherein the first reflection realm location corresponds to a projection, into the virtual reflection realm, that is based on the location of intersection of the first reflection ray on the second object and a first location of a camera for the first frame;

project, for the first frame, a first line from the first reflection realm location towards the first location of the camera;

determine, for the first frame, a location of intersection of the first line on a surface of the first object;

project, for a second frame, a second reflection ray that originates at a second point on a surface of a third object, wherein a direction of the second reflection ray is based on a surface orientation of the surface of the third object at the second point that corresponds to a second pixel in screen space;

determine, for the second frame, a location of intersection of the second reflection ray on a fourth object, wherein the second frame is subsequent to the first frame;

determine, for the second frame, a second reflection realm location in the virtual reflection realm, wherein the second reflection realm location is a second virtual location on a second virtual object in the virtual reflection realm, and wherein the second reflection realm location corresponds to a projection, into the virtual reflection realm, that is based on the location of intersection of the second reflection ray on the fourth object and a second location of the camera for the second frame;

project, for the second frame, a second line from the second reflection realm location towards the second location of the camera;

determine, for the second frame, a location of intersection of the second line on a surface of the third object;

determine that a surface roughness of the location of intersection of the second line on the surface of the third object is within a threshold roughness of a surface roughness of the location of intersection of the first line on the surface of the first object; and generate reflection information for the second point based on reflection information for the first point.

16. The device according to claim 15, wherein the first object and the third object comprise the same object.

17. The device according to claim 15, wherein generating the reflection information for the second point comprises blurring reflection information for the first point with reflection information determined for the second point.

18. The device according to claim 15, wherein the location of intersection of the first reflection ray on the second object comprises an aggregated location based on a plurality of reflection rays.

19. The device according to claim 15, wherein the one or more processors executing the instructions is further configured to cause the device to:
   determine to spawn multiple reflection rays that originate at the first point based on a surface roughness of the first object; and
   perform a look-up in a database to determine a shape of an ellipse based on the surface roughness of the first object and the first location of the camera;
   wherein the location of intersection of the multiple reflection rays on the second object is based on the shape of the ellipse.

20. The device according to claim 19, wherein performing the look-up in the database comprises obtaining data for a major axis of the ellipse and obtaining data for a minor axis of the ellipse.

* * * * *